US012330424B2

(12) United States Patent
Nagashima et al.

(10) Patent No.: US 12,330,424 B2
(45) Date of Patent: Jun. 17, 2025

(54) CARTRIDGE AND PRINTING SYSTEM

(71) Applicant: SEIKO EPSON CORPORATION, Tokyo (JP)

(72) Inventors: Takumi Nagashima, Matsumoto (JP); Yoshihiro Koizumi, Shiojiri (JP); Shun Oya, Kiso-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 160 days.

(21) Appl. No.: 18/033,426

(22) PCT Filed: Oct. 11, 2021

(86) PCT No.: PCT/JP2021/037560
§ 371 (c)(1),
(2) Date: Apr. 24, 2023

(87) PCT Pub. No.: WO2022/091759
PCT Pub. Date: May 5, 2022

(65) Prior Publication Data

US 2023/0398783 A1 Dec. 14, 2023

(30) Foreign Application Priority Data

Oct. 28, 2020 (JP) ................................ 2020-180082

(51) Int. Cl.
*B41J 2/175* (2006.01)
*B41J 2/04* (2006.01)

(52) U.S. Cl.
CPC ............ *B41J 2/17513* (2013.01); *B41J 2/04* (2013.01); *B41J 2/17523* (2013.01)

(58) Field of Classification Search
CPC ...... B41J 2/17513; B41J 2/04; B41J 2/17523; B41J 2/175; B41J 2/1752; B41J 2/1753;
(Continued)

(56) References Cited

U.S. PATENT DOCUMENTS 6,276,780 B1 8/2001 Carrese et al.
8,297,738 B1 10/2012 Kodama et al.
(Continued)

FOREIGN PATENT DOCUMENTS

CN 103442895 A 12/2013
JP 2002-019142 A 1/2002
(Continued)

OTHER PUBLICATIONS

Dec. 28, 2021 International Search Report issued in International Patent Application No. PCT/JP2021/037560.

*Primary Examiner* — Jason S Uhlenhake
*Assistant Examiner* — Alexander D Shenderov
(74) *Attorney, Agent, or Firm* — Oliff PLC

(57) ABSTRACT

A technique for preventing a decrease in an amount of liquid contained in a cartridge is provided. The cartridge includes a liquid containing portion and a liquid supply portion. The liquid supply portion is coupled to the liquid inlet portion due to rotational movement of a containing-portion-rear-wall side of the cartridge downward around a rotation fulcrum, which is located on the insertion direction side, of the cartridge mounting portion. In the insertion direction, a first distance between a liquid flowing-in port and a rear wall inner surface, which is an inner surface of a containing portion rear wall, is shorter than a second distance between the liquid flowing-in port and a front wall inner surface, which is an inner surface of a containing portion front wall.

7 Claims, 27 Drawing Sheets

(58) Field of Classification Search
CPC ............... B41J 2/17533; B41J 2/17546; B41J 2/17553; B41J 29/13; B41J 2/135
USPC ............................................................ 347/86
See application file for complete search history.

(56) References Cited

U.S. PATENT DOCUMENTS

| | | | |
|---|---|---|---|
| 8,439,482 B1 | 5/2013 | Kodama et al. | |
| 2013/0182047 A1 | 7/2013 | Nozawa et al. | |
| 2013/0182048 A1 | 7/2013 | Nozawa et al. | |
| 2018/0099505 A1 * | 4/2018 | Yamada | B41J 2/17523 |
| 2019/0299628 A1 | 10/2019 | Miyao et al. | |
| 2020/0398577 A1 | 12/2020 | Miyao et al. | |

FOREIGN PATENT DOCUMENTS

| | | | |
|---|---|---|---|
| JP | 2006-043922 | A | 2/2006 |
| JP | 2006-056118 | A | 3/2006 |
| JP | 2019-84694 | A | 6/2019 |
| JP | 2019-171738 | A | 10/2019 |
| WO | 2017/006365 | A1 | 1/2017 |

* cited by examiner

CARTRIDGE AND PRINTING SYSTEM

TECHNICAL FIELD

The present disclosure relates to a technique regarding a cartridge and a printing system.

BACKGROUND ART

Conventionally, a cartridge configured to be detachably mounted on a printing apparatus has a liquid containing space and a liquid supply port (PTL 1). In prior art, portions on both sides of the bottom surface of the liquid containing space between which the liquid supply port is located are sloped toward the liquid supply port.

CITATION LIST

Patent Literature

PTL 1: Japanese Unexamined Patent Application Publication No. 2019-84694

SUMMARY OF INVENTION

Technical Problem

If the portions on both sides are sloped, though it is possible to make a liquid flow to the liquid supply port smoothly, the capacity of the liquid containing space could decrease, resulting in a decrease in an amount of liquid contained therein. Moreover, in generally, a cartridge, when shipped, is put into an individual packaging box. If the portions on both sides of the bottom surface are sloped, when the cartridge is put into an individual packaging box, a gap will be formed between the cartridge and the individual packaging box, and the gap could decrease the occupancy ratio of the cartridge to the capacity of the individual packaging box, that is, the capacity efficiency of the individual packaging box.

Solution to Problem (1) According to a first aspect of the present disclosure, a cartridge configured to be detachably mounted into a cartridge mounting portion of a printing apparatus having a liquid inlet portion configured to receive a liquid is provided. The cartridge includes a liquid containing portion containing the liquid and having a containing portion front wall located on an insertion direction side, an insertion direction being a direction in which the cartridge is inserted into the cartridge mounting portion, a containing portion rear wall facing the containing portion front wall, and a containing portion bottom wall intersecting the containing portion front wall and the containing portion rear wall; a liquid flowing-in port formed in the containing portion bottom wall; and a liquid supply portion via which the liquid of the liquid containing portion is supplied to the liquid inlet portion, wherein the liquid supply portion is coupled to the liquid inlet portion due to rotational movement of a rear-wall side, which is closer to the containing portion rear wall, of the cartridge downward around a rotation fulcrum, which is located on the insertion direction side, of the cartridge mounting portion, and in the insertion direction, a first distance between the liquid flowing-in port and a rear wall inner surface, which is an inner surface of the containing portion rear wall, is shorter than a second distance between the liquid flowing-in port and a front wall inner surface, which is the inner surface of the containing portion front wall.

(2) According to a second aspect of the present disclosure, a printing system is provided. The printing system includes a printing apparatus including a cartridge mounting portion into which a cartridge is mounted; and the cartridge according to the above aspect.

DESCRIPTION OF EMBODIMENTS

A. Embodiment

A-1. Configuration of Printing System

Figure 1:
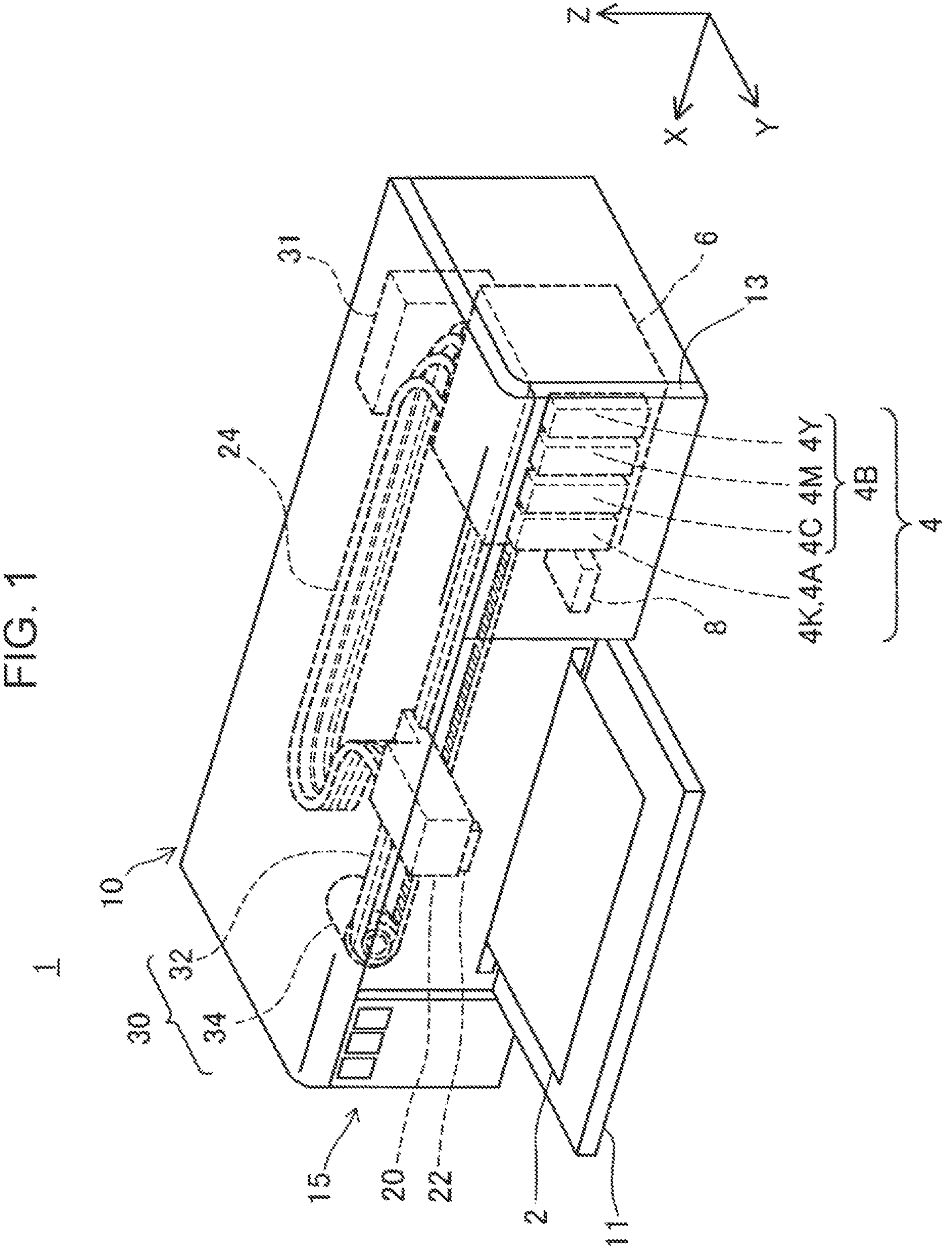
FIG. 1 is a perspective view illustrating a configuration of a printing system according to an embodiment of the present disclosure.

FIG. 1 is a perspective view illustrating a configuration of a printing system 1 according to an embodiment of the present disclosure. In FIG. 1, X, Y, and Z axes, which are three spatial axes orthogonal to one another, are drawn. Directions in which arrows of the X axis, the Y axis, and the Z axis are headed show positive directions along the X axis, the Y axis, and the Z axis, respectively. The positive directions along the X axis, the Y axis, and the Z axis will be denoted as a +X direction, a +Y direction, and a +Z direction, respectively. Directions that are the opposite of the directions in which the arrows of the X axis, the Y axis, and the Z axis are headed are negative directions along the X axis, the Y axis, and the Z axis, respectively. The negative directions along the X axis, the Y axis, and the Z axis will be denoted as a −X direction, a −Y direction, and a −Z direction, respectively. When no distinction is made between positive and negative directions, the directions along the X axis, the Y axis, and the Z axis will be referred to as an X direction, a Y direction, and a Z direction, respectively. The same applies to the subsequent drawings and the description given below.

The printing system 1 includes a printing apparatus 10, and a cartridge 4 from which ink that is a liquid is supplied to the printing apparatus 10.

The printing apparatus 10 according to the present embodiment is an ink-jet printer that ejects ink from an ejection head 22. The printing apparatus 10 is a large printer that performs printing on large-sized sheets, for example, A2 to A0 paper such as a poster. The printing apparatus 10 includes a cartridge mounting portion 6, a control unit 31, a carriage 20, the ejection head 22, and a drive mechanism 30. In addition, the printing apparatus 10 includes operation buttons 15 for a user to operate the printing apparatus 10.

A plurality of cartridges 4 are detachably mounted into the cartridge mounting portion 6 independently of one another. In the present embodiment, four types of cartridges 4 corresponding to ink of four colors of black, yellow, magenta, and cyan, that is, four cartridges 4 in total, are mounted into the cartridge mounting portion 6. The cartridge 4 containing black ink is also referred to as a cartridge 4K. The cartridge 4 containing yellow ink is also referred to as a cartridge 4Y. The cartridge 4 containing magenta ink is also referred to as a cartridge 4M. The cartridge 4 containing cyan ink is also referred to as a cartridge 4C. In the present embodiment, the cartridge 4K is configured to be able to contain a larger amount of liquid than the cartridges 4C, 4M, and 4Y. Therefore, the cartridge 4K is also referred to as a first type of cartridge 4A, and the cartridges 4C, 4M, and 4Y are also referred to as a second type of cartridge 4B.

The printing apparatus 10 includes a replacement cover 13 on its front on a +Y direction side. When a +Z direction side of the replacement cover 13 is turned toward the near side, which is the +Y direction side, an opening of the cartridge mounting portion 6 appears, and attachment and detachment of the cartridge 4 becomes possible. When the cartridge 4 is mounted in the cartridge mounting portion 6, ink can be supplied from the cartridge 4 to the ejection head 22 provided on the carriage 20 via tubes 24 serving as flow conduits. That is, the tubes 24 provide communication between the ejection head 22 and the cartridge 4. In the present embodiment, the liquid is supplied from the cartridge 4 to the ejection head 22 by utilizing a water head difference. Specifically, the ink is supplied to the ejection head 22 by means of a water head difference between a liquid surface of the ink in a liquid reservoir portion of the cartridge mounting portion 6, which will be described later, and a liquid surface formed in nozzle orifices of the ejection head 22. Alternatively, in another embodiment, the ink may be supplied to the ejection head 22 by sucking the ink contained in the cartridge 4 by a non-illustrated pump mechanism of the printing apparatus 10. The tubes 24 are provided for the respective types of ink. A state in which the cartridge 4 is mounted in the cartridge mounting portion 6 and the ink as the liquid can be supplied to the printing apparatus 10 is also referred to as a "mounted state".

The ejection head 22 is provided with nozzles for each type of ink. The ejection head 22 ejects the ink from the nozzles toward a printing sheet 2 to print data such as characters or images. The mounting of the cartridge 4 into the cartridge mounting portion 6, and a detailed configuration of the cartridge 4 and the cartridge mounting portion 6, will be described later. In the present embodiment, the printing apparatus 10 is a so-called "off-carriage type" printer, in which the cartridge mounting portion 6 does not move together with the carriage 20. The present disclosure can also be applied to a so-called "on-carriage type" printer, in which the cartridge mounting portion 6 is provided on the carriage 20 and moves together with the carriage 20.

The control unit 31 controls each portion of the printing apparatus 10 and signal interaction with the cartridge 4. The carriage 20 moves the ejection head 22 relative to the printing sheet 2.

The drive mechanism 30 reciprocates the carriage based on a control signal from the control unit 31. The drive mechanism 30 includes a timing belt 32 and a drive motor 34. Driven by power of the drive motor 34 transmitted to the carriage 20 via the timing belt 32, the carriage 20 reciprocates in a main-scanning direction, which is a direction along the X direction. The printing apparatus 10 includes a transport mechanism for moving the printing sheet 2 in a sub-scanning direction, which is the +Y direction. When printing is performed, the printing sheet 2 is moved in the sub-scanning direction by the transport mechanism, and the printing sheet 2 after completion of printing is outputted onto a front cover 11.

There is an area called as a home position at a location outside a printing area where the carriage 20 is moved in the main-scanning direction. A maintenance mechanism that performs maintenance for proper print execution is mounted at the home position. The maintenance mechanism includes a cap member 8, an elevating-and-lowering mechanism that is not illustrated, and a suction pump that is not illustrated. The cap member 8 is pushed against a surface on which the nozzles are formed on a bottom-surface side of the ejection head 22 to form a closed space in such a way as to surround the nozzles. The elevating-and-lowering mechanism elevates and lowers the cap member 8 in order to push the cap member 8 against the nozzle surface of the ejection head 22. The suction pump introduces a negative pressure into the closed space formed by the cap member 8 being pushed against the nozzle surface of the ejection head 22.

In the present embodiment, in a use state of the printing system 1, an axis along the sub-scanning direction in which the printing sheet 2 is transported is the Y axis, an axis along a gravity direction is the Z axis, and an axis along a moving direction of the carriage 20 is the X axis. Here, the "use state of the printing system 1" refers to a state in which the printing system 1 is installed on a horizontal plane. In the present embodiment, the sub-scanning direction is the +Y direction, the direction that is the opposite thereof is the −Y direction, the gravity direction is the −Z direction, and the direction that is the opposite of the gravity direction is the +Z direction. The X direction and the Y direction are directions going horizontally. When the printing system 1 is viewed from the front side, the direction going from the right side to the left side is the +X direction, and the direction that is the opposite thereof is the −X direction. In the present embodiment, the direction in which the cartridge 4 is inserted into the cartridge mounting portion 6 for mounting is the −Y direction, and the direction in which the cartridge 4 is removed from the cartridge mounting portion 6 is the +Y direction. Therefore, the −Y direction side of the cartridge mounting portion 6 is also referred to as a far side, and a +Y direction side of the cartridge mounting portion 6 is also referred to as a near side. In the present embodiment, the direction in which the plurality of cartridges 4 are arranged is the X direction.

A-2. Schematic Configuration of Mounted State of Cartridge 4

Figure 2:
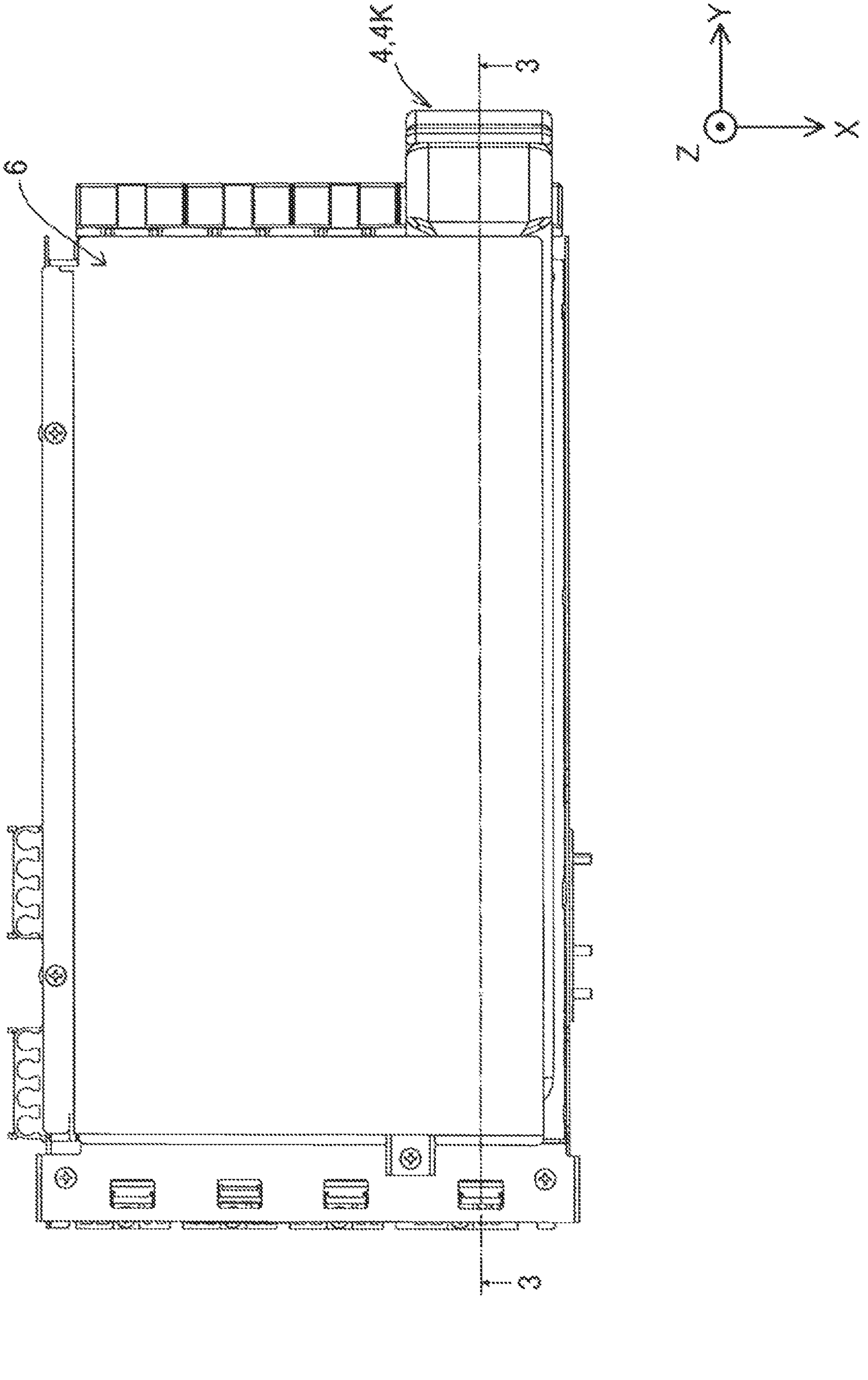
FIG. 2 is a view of a cartridge mounting portion when viewed from the +Z direction side.
Figure 3:
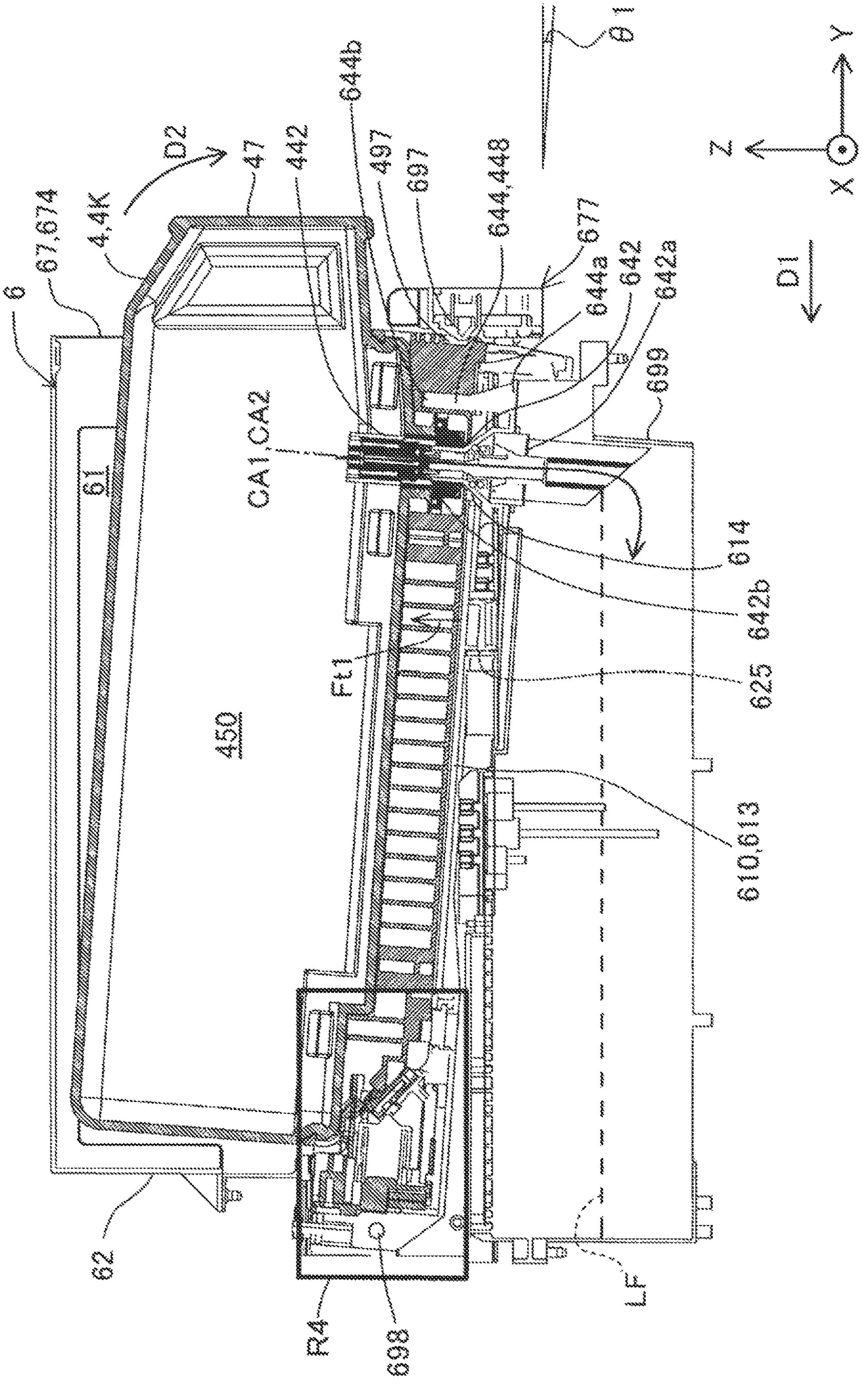
FIG. 3 is a sectional view taken along the line 3-3 of FIG. 2.
Figure 4:
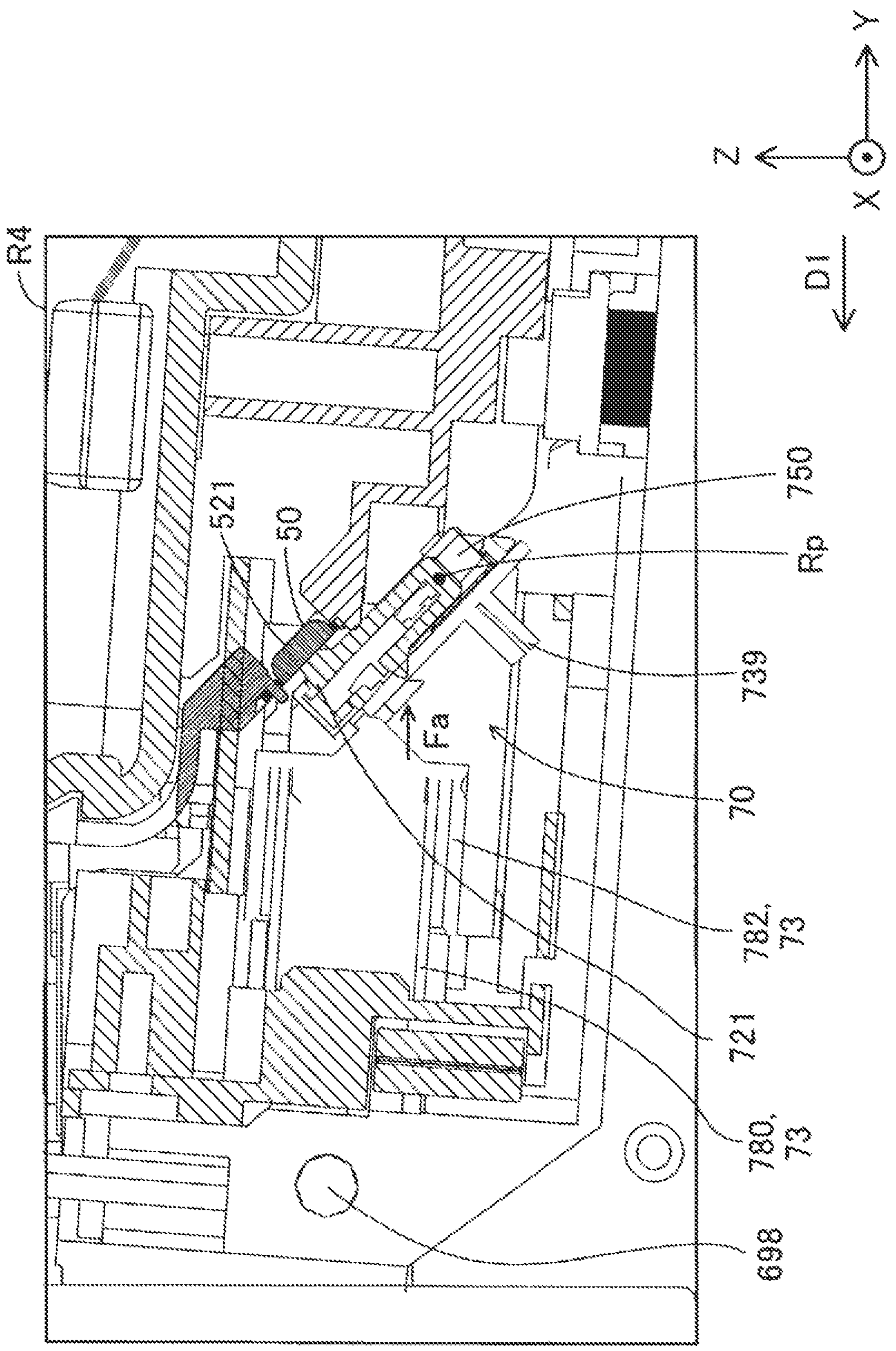
FIG. 4 is an enlarged view of a region R4 of FIG. 3.

FIG. 2 is a view of the cartridge mounting portion 6 when viewed from the +Z direction side. FIG. 3 is a sectional view taken along the line 3-3 of FIG. 2. FIG. 4 is an enlarged view of a region R4 of FIG. 3. In FIG. 2, the cartridge 4K is mounted in the cartridge mounting portion 6. A mounting process and a schematic configuration of a mounted state of the cartridge 4 will now be described with reference to FIGS. 2 to 4. The mounting process and mounted state are the same for the cartridges 4C, 4M, 4Y, and 4K.

As illustrated in FIG. 3, the cartridge 4 is inserted in the insertion direction and is inserted into an accommodation space 61 of the cartridge mounting portion 6 through an insertion/removal opening 674 which a first apparatus wall 67 of the cartridge mounting portion 6 has. As a result, the accommodation space 61 accommodates the cartridge 4. The insertion/removal opening 674 is an entrance/exit into/out of the accommodation space 61 of the cartridge 4. In a state in which the cartridge 4 is inserted in the accommodation space 61 of the cartridge mounting portion 6, the cartridge 4 is supported from a −Z direction side by a support member 610 of the cartridge mounting portion 6. In addition, in the mounted state, in which the cartridge 4 is mounted in the accommodation space 61 of the cartridge mounting portion 6, a liquid supply portion 442 of the cartridge 4 and a liquid inlet portion 642 of the cartridge mounting portion 6 are coupled to each other. As a result, the ink contained in a liquid containing portion 450 of the cartridge 4 is supplied to the liquid inlet portion 642 via the liquid supply portion 442. In the present embodiment, the ink is supplied from the liquid supply portion 442 to the liquid inlet portion 642, and, on the other hand, air contained in the liquid reservoir portion 699 of the cartridge mounting portion 6 enters the liquid containing portion 450 as air bubbles through the liquid inlet portion 642 and the liquid supply portion 442. As a result, gas-liquid exchange in the liquid containing portion 450 is performed. In another embodiment, the cartridge 4 may have an atmospheric communication passage communicating the liquid containing portion 450 with the outside, and gas-liquid exchange may be performed through the atmospheric communication passage. The atmospheric communication passage is disposed at a location different from that of the liquid supply portion 442 and is formed, for example, in a wall forming the liquid containing portion 450.

When the liquid is supplied from the liquid reservoir portion 699 to the ejection head 22 via the tube 24, gas-liquid exchange is performed through the liquid inlet portion 642, and a liquid for replenishment is supplied from the cartridge 4 to the liquid reservoir portion 699. For this reason, the liquid surface LF that is exposed to air in the liquid reservoir portion 699 is kept at a constant level. Therefore, the water head difference, which is a difference in level between the liquid surface LF and the liquid surface of the nozzle orifices of the ejection head 22 exposed to atmospheric air, is kept constant. Consequently, it is possible to supply the liquid to the ejection head stably by utilizing the water head difference as driving power.

The liquid inlet portion 642 receives the liquid supplied from the cartridge 4. The liquid inlet portion 642 is a cylindrical member and has an internal flow passage for making the liquid flow therein. The liquid inlet portion 642 has a base end portion 642*a* and a tip portion 642*b*. An opening communicating with the internal flow passage is formed in the tip portion 642*b*. The ink of the liquid supply portion 442 flows to the internal flow passage through this opening. The base end portion 642*a* is connected to the liquid reservoir portion 699 and allows the ink that has flowed through the internal flow passage flow to flow into the liquid reservoir portion 699. The liquid reservoir portion 699 is located on a −Z direction side of the accommodation space 61. The liquid reservoir portion 699 communicates with the ejection head 22 via the tube 24 illustrated in FIG. 1. As described above, the liquid inlet portion 642 communicates with the ejection head 22 via the liquid reservoir portion 699 and the tube 24. A central axis CA1 of the liquid inlet portion 642 is parallel to a central axis CA2 of the liquid supply portion 442 in the mounted state and is inclined with respect to the Z direction. That is, a direction along the central axis CA1, which is a direction in which the liquid inlet portion 642 extends, intersects the insertion direction of the cartridge 4. A direction along the central axis CA2 of the liquid supply portion 442 is a direction in which the liquid supply portion 442 extends.

As illustrated in FIG. 4, in the mounted state of the cartridge 4, a circuit board 50 of the cartridge 4 and an apparatus-side terminal portion 70 of the cartridge mounting portion 6 are electrically connected to each other by being in contact with each other. The apparatus-side terminal portion 70 is held by a holding mechanism 73. The apparatus-side terminal portion 70 includes a plurality of apparatus-side terminals 721, a terminal holding portion 750, and a connector 739.

In the present embodiment, the number of the plurality of apparatus-side terminals 721 provided is nine. Each of the plurality of apparatus-side terminals 721 is a conductive metal plate member. The apparatus-side terminal 721 has a terminal rotation fulcrum Rp. Of the apparatus-side terminal 721, a portion in contact with a cartridge-side terminal 521 of the circuit board 50, which is an end portion, is elastically deformable using the terminal rotation fulcrum Rp as a fulcrum. The direction in which the portion is elastically deformed is a direction along the Y direction and the Z direction. The terminal holding portion 750 holds the plurality of apparatus-side terminals 721. The connector 739 is electrically connected to the plurality of apparatus-side terminals 721. In addition, the connector 739 is electrically connected to the control unit 31 of the printing apparatus 10 by wiring that is not illustrated. This connection enables data communication between the circuit board 50 and the control unit 31.

The holding mechanism 73 includes an urging member 780 and an attaching member 782. The urging member 780 is formed of a coil spring. The urging member 780 is disposed at an inner side of the attaching member 782. The apparatus-side terminal portion 70 is attached to the attaching member 782. The urging member 780 is in a compressed state when the insertion of the cartridge 4 into the cartridge mounting portion 6 has completed. Because of this compression, the urging member 780 applies, to the apparatus-side terminal portion 70 via the attaching member 782, an external force Fa acting in a direction toward a removal-direction side of the cartridge 4, which is toward the first apparatus wall 67. Since the apparatus-side terminal portion 70 is pushed against the circuit board 50 by the external force Fa, good contact between the apparatus-side terminals 721 and the cartridge-side terminals 521 is maintained.

As described above, the holding mechanism 73 holds the apparatus-side terminal portion 70 such that the apparatus-side terminal portion 70 is displaceable in a direction along the insertion direction D1 of the cartridge 4. In addition, one end portion of the urging member 780 on the side where the apparatus-side terminal portion 70 is located is configured to be slightly movable in the X direction and the Z direction intersecting the insertion direction D1. Because of this configuration, the apparatus-side terminal portion 70 is held by the holding mechanism 73 in such a way as to be slightly movable in the X direction and the Z direction intersecting the insertion direction D1.

A mounting process of mounting the cartridge 4 into the cartridge mounting portion 6 includes a terminal connection process and a supply portion coupling process executed after the terminal connection process. The terminal connection process is a process of bringing the apparatus-side terminals 721 and the cartridge-side terminals 521 into contact with each other and thus establishing an electric connection therebetween by moving the cartridge 4 in the insertion direction D1, which is the −Y direction, to insert the cartridge 4 into the accommodation space 61 of the cartridge mounting portion 6 through the insertion/removal opening 674 of the first apparatus wall 67. The supply portion coupling process is a process of coupling the liquid inlet portion 642 and the liquid supply portion 442 to each other by rotationally moving a rear-surface 47 side of the cartridge 4 in a coupling direction D2, which is indicated by an arrow, while maintaining the electric connection between the apparatus-side terminals 721 and the cartridge-side terminals 521 as illustrated in FIG. 3, around a rotation fulcrum 698 of the support member 610. The rotation fulcrum 698 is provided on the side on which a second apparatus wall 62 of the cartridge mounting portion 6 is located and toward which the insertion direction D1 goes. The angle of this rotational movement of the cartridge 4 at the time of coupling the liquid supply portion 442 to the liquid inlet portion 642 is defined as a rotation angle θ1. In the present embodiment, the rotation angle θ1 is set to be 5°. That is, in the mounted state of the cartridge 4, in which the liquid supply portion 442 is coupled to the liquid inlet portion 642, the rear-surface 47 side of the cartridge 4 has been rotated downward by 5°.

As illustrated in FIG. 3, in the supply portion coupling process, an apparatus-side supply portion positioning portion 644, which is a projection included in the cartridge mounting portion 6, enters a supply portion positioning portion 448, which is included in the cartridge 4 and has a recessed shape, so as to restrict the movement of the liquid supply portion 442 in a direction intersecting with the central axis CA2 of the liquid supply portion 442. As a result, positioning of the liquid supply portion 442 with respect to the liquid inlet portion 642 is performed. The apparatus-side supply portion positioning portion 644 has a substantially rectangular parallelepiped shape. The apparatus-side supply portion positioning portion 644 has one end portion 644*a* and the other end portion 644*b*. The one end portion 644*a* is located on the side where the liquid reservoir portion 699 is located. The one end portion 644*a* is located closer to the accommodation space 61 than the other end portion 644*b* is.

In the mounted state of the cartridge 4, a main wall 613 forming a bottom portion of the support member 610 is inclined with respect to the Y direction. Specifically, the main wall 613 of the support member 610 is inclined such that it is located closer to the −Z direction side, which is a lower side, as it extends toward a +Y-axis direction. The main wall 613 is parallel to the Y direction in an initial arrangement state of the cartridge mounting portion 6 to which the cartridges 4 are not mounted.

The cartridge mounting portion 6 includes an apparatus urging member 625 that applies an external force Ft1 to the support member 610 in order to return the support member 610 to its position of the initial arrangement state in the mounted state of the cartridge 4. The apparatus urging member 625 is a coil spring that is provided between the support member 610 and the liquid reservoir portion 699 and is in a compressed state in the mounted state. The apparatus urging member 625 that is in the compressed state applies the external force Ft1 having a +Z direction component to the support member 610. On the other hand, in the mounted state of the cartridge 4, a cartridge engaging portion 497 of the cartridge 4 engages with a mounting engaging portion 697 of the cartridge mounting portion 6, so that the mounted state is maintained. The mounting engaging portion 697 is formed on an engagement forming body 677 of the cartridge mounting portion 6.

A-3. Detailed Configuration of Cartridge Mounting Portion 6

Figure 5:
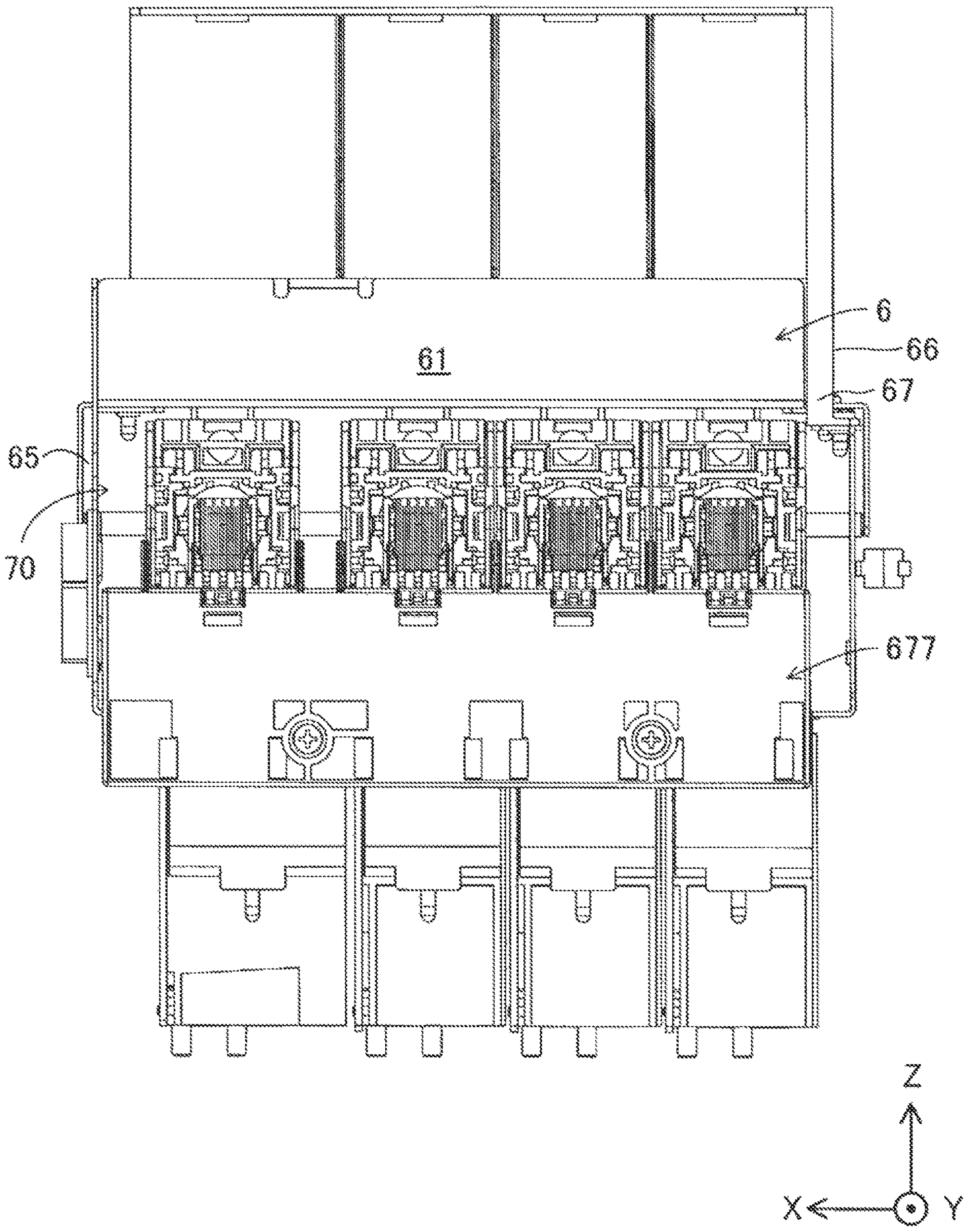
FIG. 5 is a view of the cartridge mounting portion when viewed from the +Y direction side.
Figure 6:
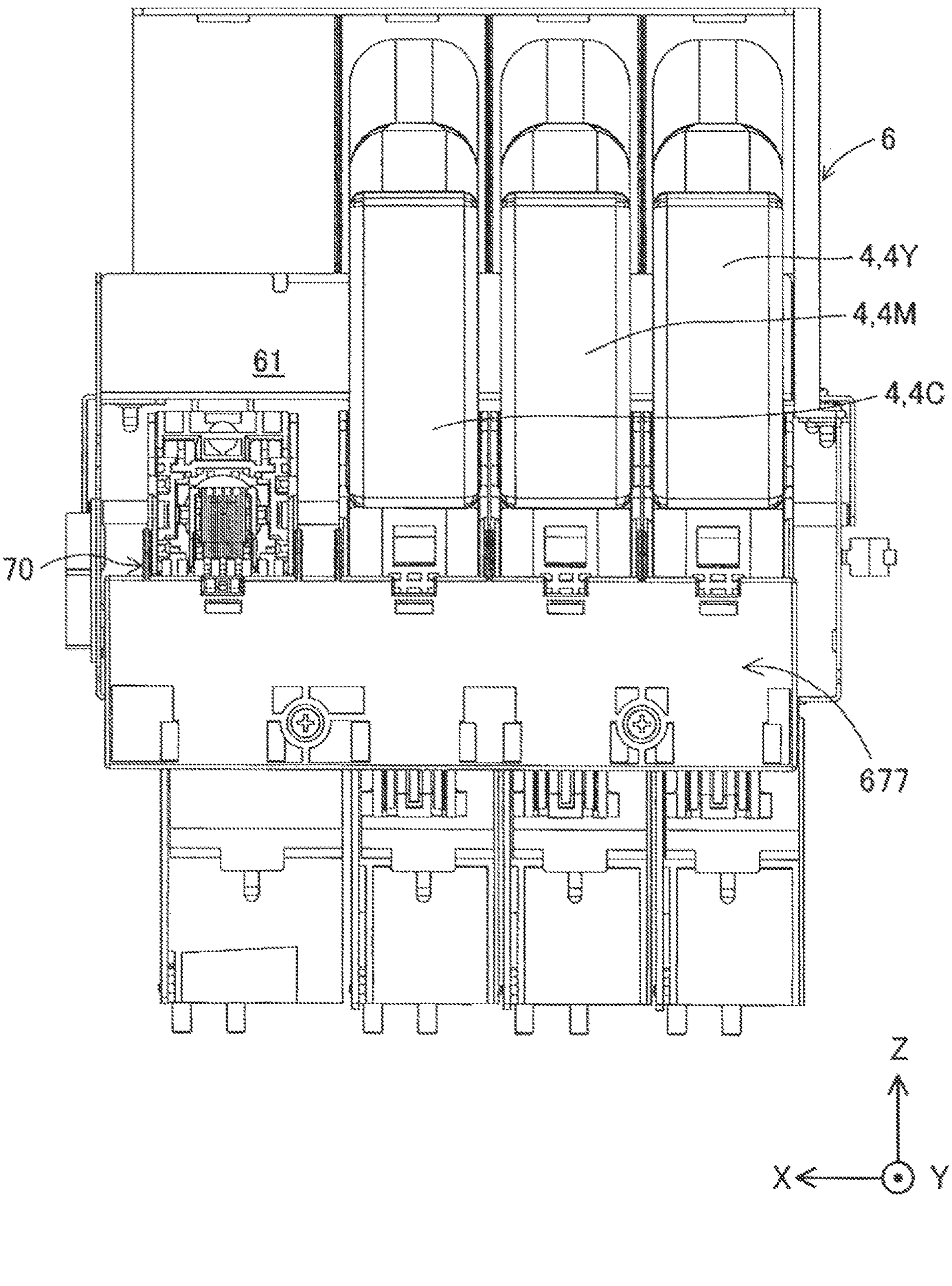
FIG. 6 is a view illustrating that cartridges are mounted in the cartridge mounting portion.
Figure 7:
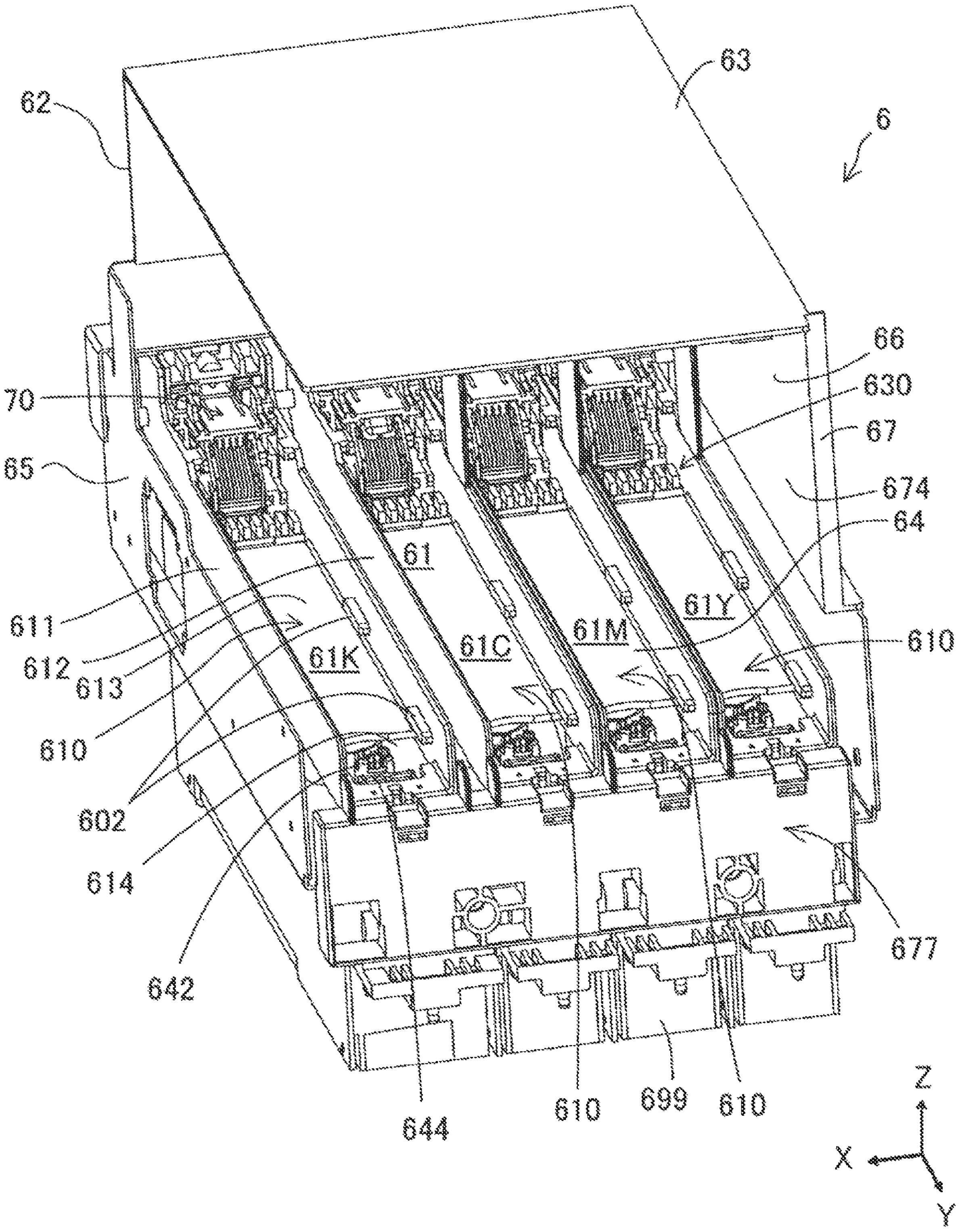
FIG. 7 is a perspective view of the cartridge mounting portion.
Figure 8:
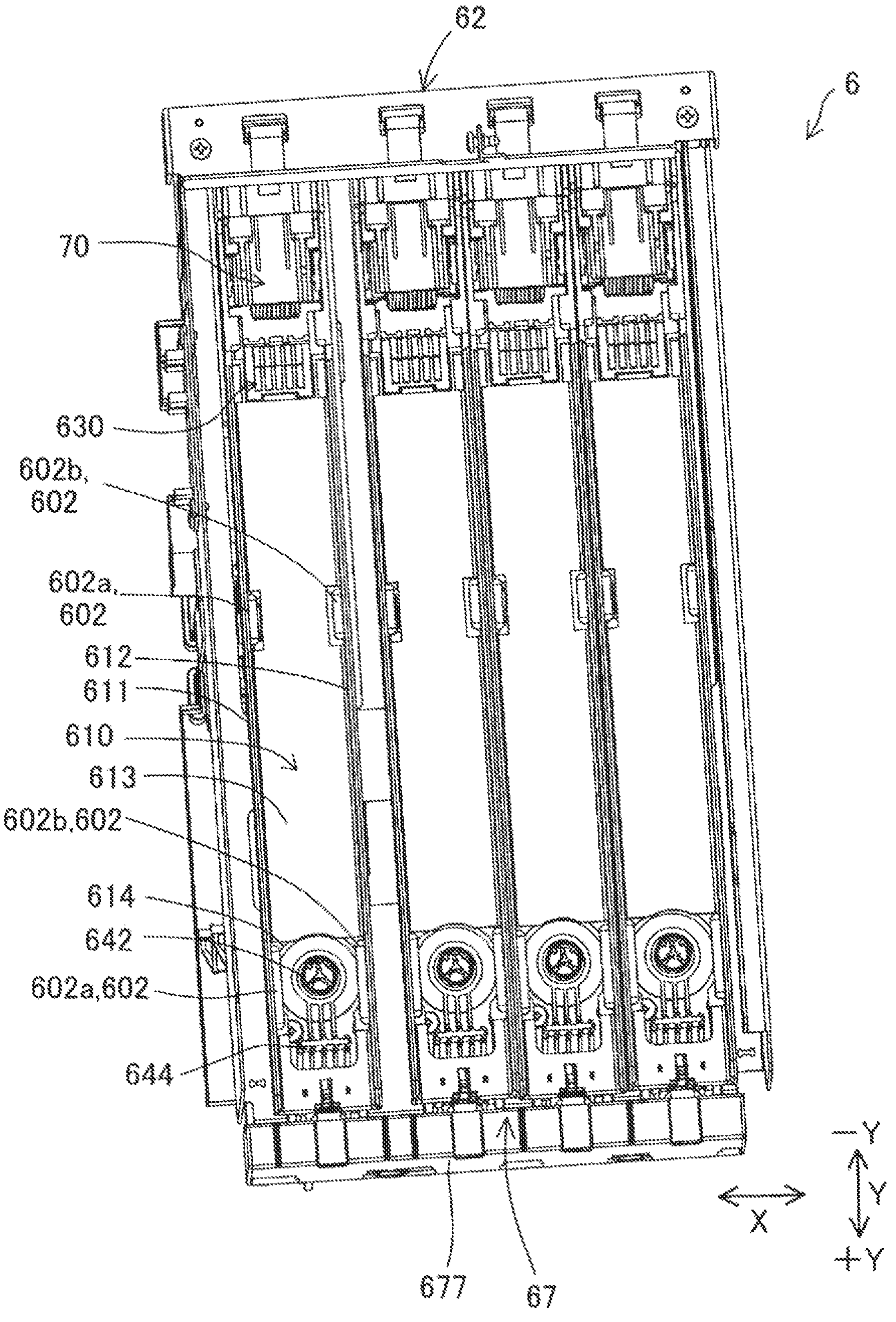
FIG. 8 is a view of the cartridge mounting portion when viewed from the +Z direction side.
Figure 9:
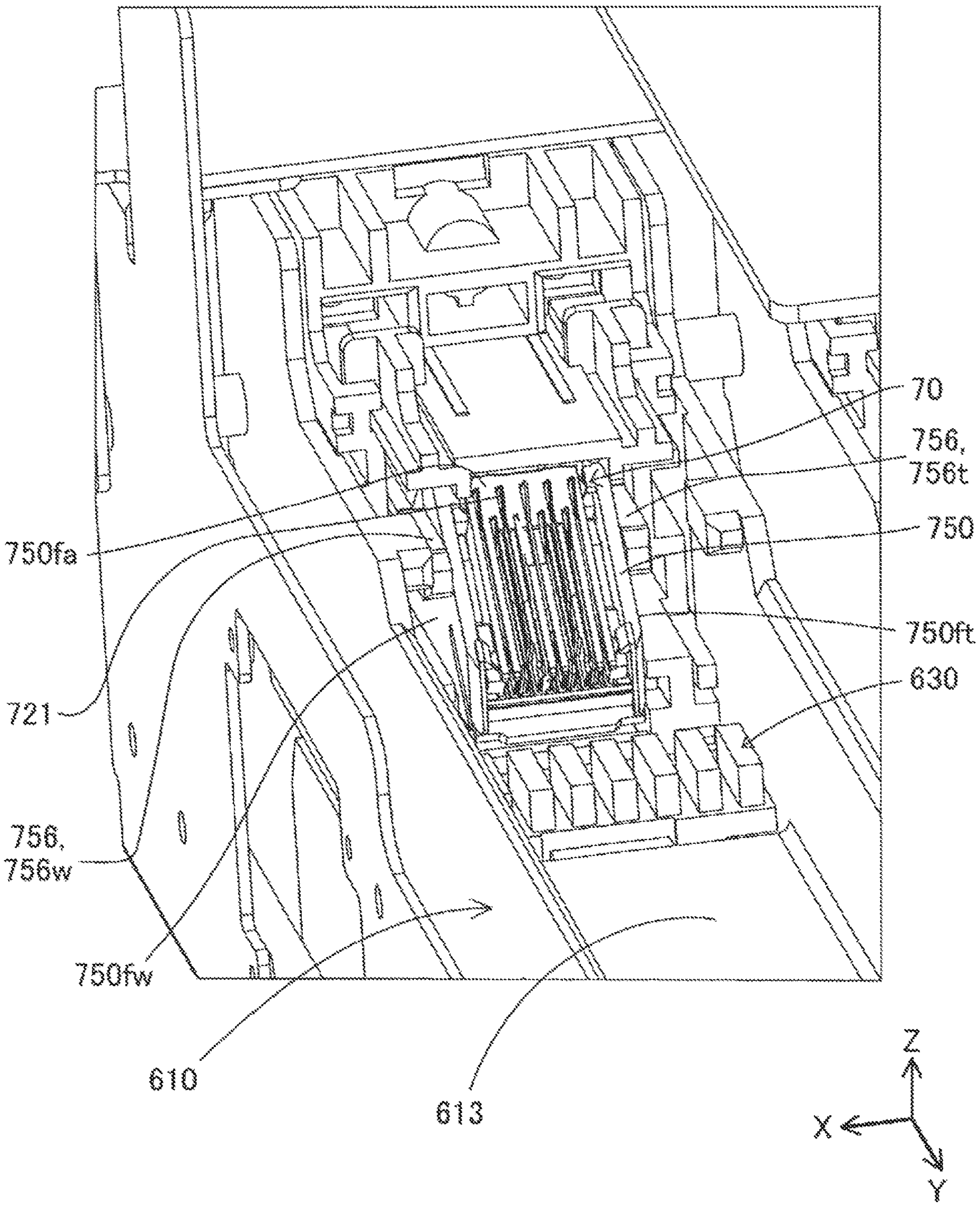
FIG. 9 is a partially enlarged view of the cartridge mounting portion.
Figure 10:
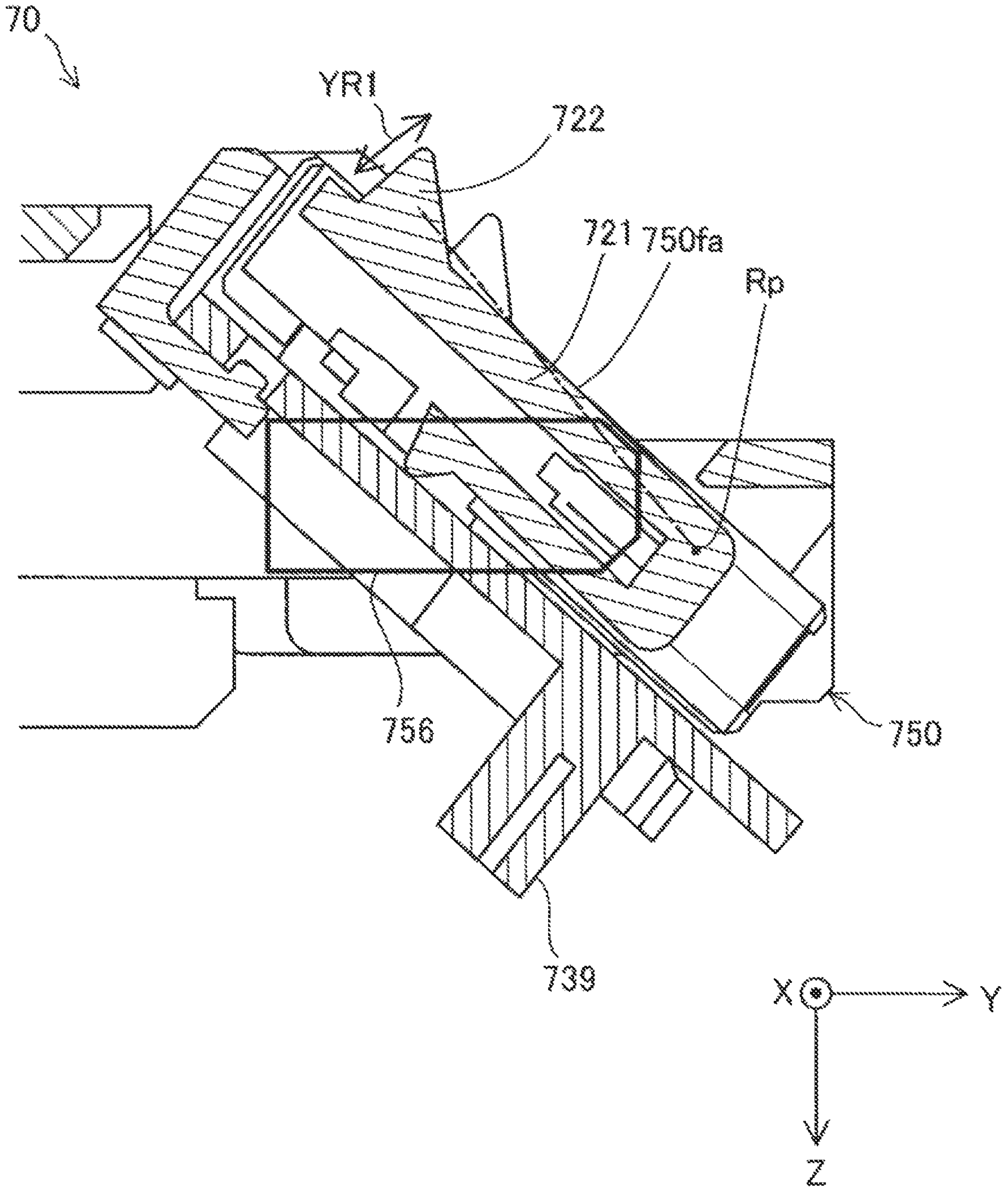
FIG. 10 is a schematic sectional view of an apparatus-side terminal portion.

FIG. 5 is a view of the cartridge mounting portion 6 when viewed from the +Y direction side. FIG. 6 is a view illustrating that the cartridges 4 are mounted in the cartridge mounting portion 6. FIG. 7 is a perspective view of the cartridge mounting portion 6. FIG. 8 is a view of the cartridge mounting portion 6 when viewed from the +Z direction side. FIG. 9 is a partially enlarged view of the cartridge mounting portion 6. FIG. 10 is a schematic sectional view of the apparatus-side terminal portion 70. In FIGS. 6 to 10, in order to facilitate understanding, the illustration of some of the components of the cartridge mounting portion 6 is omitted. Regarding the cartridge mounting portion 6, the X direction is also referred to as a width direction, the Y direction is also referred to as a depth direction, and the Z direction is also referred to as a height direction. In the description below, unless there is a particular mention of a state, each element will be described on the premise of the cartridge mounting portion 6 in the initial arrangement state in which no cartridge 4 is mounted in the cartridge mounting portion 6.

As illustrated in FIGS. 5 to 7, in the cartridge mounting portion 6, the accommodation space 61 in which the cartridges 4 are to be accommodated is formed. The accommodation space 61 has a substantially rectangular parallelepiped shape. Broadly speaking, slots 61C, 61M, 61Y, and 61K, which are portions of the accommodation space 61 for accommodating the respective cartridges 4C, 4M, 4Y, and 4K, correspond to appearance shapes of the respective cartridges 4C, 4M, 4Y, and 4K. In the present embodiment, the cartridge 4K has a greater dimension in the X direction than the other cartridges 4C, 4M, and 4Y in order to increase an amount of liquid to be contained. Therefore, in the present embodiment, a width of the slot 61K is greater than that of the other slots 61C, 61M, and 61Y.

As illustrated in FIG. 7, the cartridge mounting portion 6 has six apparatus walls 62, 63, 64, 65, 66, and 67 forming the accommodation space 61. In the present disclosure, the concept of the term "wall" includes not only a single wall but also a wall composed of a plurality of walls. In the first apparatus wall 67, the insertion/removal opening 674, through which the cartridge 4 passes when inserted into or removed from the accommodation space 61, is formed. The second apparatus wall 62 forms a wall of the accommodation space 61 on the −Y direction side. The second apparatus wall 62 faces the first apparatus wall 67 in the Y direction. The second apparatus wall 62 is a substantially vertical wall in a use state of the printing apparatus 10.

An apparatus top wall 63 forms a wall of the accommodation space 61 on the +Z direction side. An apparatus bottom wall 64 faces the apparatus top wall 63 in the Z direction and forms a wall of the accommodation space 61 on the −Z direction side. The apparatus bottom wall 64 is formed of the support member 610. The apparatus bottom wall 64 has a plurality of openings 614. In the present embodiment, four openings 614 corresponding to the slots 61C, 61M, 61Y, and 61K are formed. The apparatus top wall 63 and the apparatus bottom wall 64 intersect the second apparatus wall 62 and the first apparatus wall 67. In the present disclosure, the term "cross" or "intersect" means any one of (i) a state in which two elements intersect and actually cross each other, (ii) a state in which one element would cross the other element if the one element were extended, and (iii) a state in which mutual elements, if they were extended respectively, would cross each other.

A first apparatus sidewall 65 forms a wall of the accommodation space 61 on the +X direction side. A second apparatus sidewall 66 faces the first apparatus sidewall 65 in the X direction and forms a wall of the accommodation space 61 on the −X direction side. The first apparatus sidewall 65 and the second apparatus sidewall 66 intersect the second apparatus wall 62, the first apparatus wall 67, the apparatus top wall 63, and the apparatus bottom wall 64.

As illustrated in FIGS. 7 and 8, the cartridge mounting portion 6 further includes the support member 610, the liquid inlet portion 642, the supply portion positioning portion 644, apparatus guide portions 602, and the engagement forming body 677. A plurality of support members 610 whose number corresponds to the number of cartridges 4 to be mounted are provided. In the present embodiment, four support members 610 are provided. The support member 610 forms the apparatus bottom wall 64 of the accommodation space 61 on a gravity direction side. The support member 610 supports the cartridge 4 from the −Z direction side, which is the gravity direction side. The support member 610 is a member extending along the Y direction. The support member 610 has a recessed shape. The support member 610 has the main wall 613 forming the apparatus bottom wall 64, a first support sidewall 611, and a second support sidewall 612.

The main wall 613 forms a bottom portion located on the gravity direction side and having a recessed shape. The openings 614 are formed at the end of the main wall 613 on the side where the first apparatus wall 67 is located. The openings 614 penetrate through the main wall 613 in a thickness direction of the main wall 613.

As illustrated in FIG. 7, the first support sidewall 611 rises from a +X-direction-side end portion of the main wall 613 in the +Z direction, which is the direction that is the opposite of the gravity direction. The second support sidewall 612 rises from a −X-direction-side end portion of the main wall 613 in the +2 direction. The first support sidewall 611 and the second support sidewall 612 face each other in the X direction.

The apparatus guide portions 602 guide the cartridge 4 in the insertion direction and the removal direction. The apparatus guide portions 602 are provided for each support member 610. The apparatus guide portions 602 are provided on each of the first support sidewall 611 and the second support sidewall 612. The apparatus guide portions 602 are projections provided on the first support sidewall 611 and the second support sidewall 612. As illustrated in FIG. 8, a first apparatus guide portion **602*a* provided on the first support sidewall 611 is a projection protruding from the first support sidewall 611 toward the second support sidewall 612. The first apparatus guide portion 602*a* extends along the Y direction. A plurality of first apparatus guide portions 602*a* are arranged at intervals in the Y direction. A second apparatus guide portion 602*b* provided on the second support sidewall 612 is a projection protruding from the second support sidewall 612 toward the first support sidewall 611. The second apparatus guide portion 602*b* extends along the Y direction. A plurality of second apparatus guide portions 602*b*** are arranged at intervals in the Y direction.

As illustrated in FIGS. 7 and 8, the liquid inlet portion 642 receives the liquid of the cartridge 4. In the initial arrangement state of the cartridge mounting portion 6, the liquid inlet portion 642 is not located in the accommodation space 61, but is located on the −Z direction side with respect to the accommodation space 61. That is, the liquid inlet portion 642 is located on the opposite side away from the accommodation space 61, with the support member 610 interposed therebetween. Therefore, when the cartridge 4 is inserted into the accommodation space 61 of the cartridge mounting portion 6, it is possible to prevent the cartridge 4 from colliding with the liquid inlet portion 642. As described above, as illustrated in FIG. 3, the tip portion **642*b* of the liquid inlet portion 642 is put into the accommodation space 61 by rotationally moving the support member 610 around the rotation fulcrum 698 in the coupling direction D2 to lower the opening 614. That is, the rotation fulcrum 698 as a displacement mechanism puts the tip portion 642*b* of the liquid inlet portion 642 into the accommodation space 61 through the opening 614 by letting the support member 610 move rotationally to cause displacement of the opening 614** toward the gravity-direction side.

The apparatus-side supply portion positioning portion 644 illustrated in FIG. 7 is received by the supply portion positioning portion 448 so as to restrict the movement of the liquid supply portion 442 with respect to the liquid inlet portion 642. As a result, positioning of the liquid supply portion 442 is performed. In the initial arrangement state of the cartridge mounting portion 6, the apparatus-side supply portion positioning portion 644 is not located in the accommodation space 61, but is located on the −Z direction side with respect to the accommodation space 61. That is, the apparatus-side supply portion positioning portion 644 is located on the opposite side away from the accommodation space 61, with the support member 610 interposed therebetween. Therefore, when the cartridge 4 is inserted into the accommodation space 61 of the cartridge mounting portion 6, it is possible to prevent the cartridge 4 from colliding with the apparatus-side supply portion positioning portion 644. The other end portion 644*b* of the apparatus-side supply portion positioning portion 644 is put into the accommodation space 61 by rotating the support member 610 around the rotation fulcrum 698 in the coupling direction D2 to lower the opening 614. That is, the rotation fulcrum 698 puts the other end portion 644*b* of the apparatus-side supply portion positioning portion 644 into the accommodation space 61 through the opening 614 by letting the support member 610 rotate to cause displacement of the opening 614.

As illustrated in FIG. 8, the cartridge mounting portion 6 further includes the apparatus-side terminal portion 70 and an apparatus-side identification member 630. As illustrated in FIG. 9, the terminal holding portion 750 included in the apparatus-side terminal portion 70 includes a holding portion surface 750*fa*, on which the apparatus-side terminal 721 is exposed, a first holding portion sidewall 750*ft*, and a second holding portion sidewall 750*fw*. The first holding portion sidewall 750*ft* forms a sidewall of the terminal holding portion 750 on the −X direction side. The second holding portion sidewall 750*fw* forms a sidewall of the terminal holding portion 750 on the +X direction side.

As illustrated in FIGS. 8 and 9, the apparatus-side identification members 630 are used for identifying whether or not correct types of cartridges 4C, 4M, 4Y, and 4K have been inserted into the respective slots 61C, 61M, 61Y, and 61K of the accommodation space 61. The apparatus-side identification members 630 form different pattern shapes corresponding to the colors of the liquids contained in the cartridges 4C, 4M, 4Y, and 4K. In FIG. 8, in the respective slots 61C, 61M, 61Y, and 61K, the apparatus-side identification members 630 have the same pattern shape for convenience, but actually have different pattern shapes. The apparatus-side identification member 630 is provided on the main wall 613 of the support member 610.

As illustrated in FIG. 9, the apparatus-side identification member 630 is formed of at least one or more ribs. The pattern shape is determined by the number and locations of ribs. The cartridges 4 are also provided with cartridge-side identification members formed of ribs. The cartridge-side identification members form different pattern shapes corresponding to the types of the cartridge 4, that is, the colors of the liquids contained therein. When a correct type of cartridge 4 is inserted into the corresponding slot 61C to 61K, the apparatus-side identification member 630 and the cartridge-side identification member fit with each other without any collision. On the other hand, when a wrong type of cartridge 4 is inserted into the slot 61C to 61K, the apparatus-side identification member 630 and the cartridge-side identification member collide with each other, so that further insertion of the cartridge 4 is hindered. This makes it possible to reduce a possibility that a wrong type of cartridge 4 will be mounted into the slot 61C to 61K of the cartridge mounting portion 6.

As illustrated in FIG. 9, the apparatus-side terminal portion 70 includes an apparatus-side terminal positioning portion 756 in addition to the plurality of apparatus-side terminals 721, the terminal holding portion 750, and the connector 739 described above. The apparatus-side terminal positioning portion 756 is received by a terminal positioning portion of the cartridge 4 in an insertion process of the cartridge 4 into the accommodation space 61, so that movement in the X direction and the Y direction, which are directions intersecting the insertion direction, is restricted. As a result, positioning of the apparatus-side terminals 721 and the cartridge-side terminals 521 in the directions intersecting the insertion direction is performed.

Two apparatus-side terminal positioning portions 756 are provided for each of the slots 61C to 61K. One of the two apparatus-side terminal positioning portions 756 is also referred to as a first apparatus-side terminal positioning portion 756*t*, and the other of the two apparatus-side terminal positioning portions 756 is also referred to as a second apparatus-side terminal positioning portion 756*w*. The first apparatus-side terminal positioning portion 756*t* and the second apparatus-side terminal positioning portion 756*w* are columnar members extending in the Y direction, respectively. The first apparatus-side terminal positioning portion 756*t* is provided on the first holding portion sidewall 750*ft*. The second apparatus-side terminal positioning portion 756*w* is provided on the second holding portion sidewall 750*fw*.

As illustrated in FIG. 10, the holding portion surface 750*fa* of the terminal holding portion 750 is inclined with respect to the Y direction and the Z direction toward a direction including a +Y direction component and a +Z direction component. A terminal contact 722 of the apparatus-side terminal 721 configured to be in contact with the circuit board 50 protrudes from the holding portion surface 750*fa*. The terminal contact 722 is in a state of being elastically deformable in a direction of an arrow YR1. A +Y-direction-side end portion of the apparatus-side terminal positioning portion 756 is located on the +Y direction side with respect to the terminal contact 722.

As illustrated in FIG. 8, the apparatus-side terminal portion 70 and the apparatus-side identification member 630 are provided on the support member 610, respectively. With regard to the Y direction, which is the direction in which the support member 610 extends, the apparatus-side terminal portion 70 and the apparatus-side identification member 630 are located on the opposite side away from the first apparatus wall 67, with the liquid inlet portion 642 and the opening 614 interposed therebetween. Specifically, the apparatus-side terminal portion 70 and the apparatus-side identification member 630 are provided in the vicinity of the second apparatus wall 62. In addition, the apparatus-side terminal portion 70 is located closer to the second apparatus wall 62, which is on the −Y direction side, than the apparatus-side identification member 630 is. Because of this configuration, in the insertion process of the cartridge 4, after the mating of the cartridge-side identification member and the apparatus-side identification member 630 is started, contact between the apparatus-side terminals 721 and the cartridge-side terminals 521 is started. Therefore, it is possible to prevent a storage device of the circuit board 50 and the control unit 31 from being electrically connected to each other in a state in which a wrong type of cartridge 4 is mounted, with the cartridge-side terminals 521 of the wrong type of cartridge 4 and the apparatus-side terminals 721 being in contact with each other.

As illustrated in FIG. 7, the engagement forming body 677 is formed on the +Y direction side with respect to the support member 610. In addition, the engagement forming body 677 is located on the −Z direction side with respect to the insertion/removal opening 674. Four mounting engaging portions 697 illustrated in FIG. 3 are arranged in the engagement forming body 677 so as to corresponding to the respective slots 61C to 61K.

A-4. Detailed Configuration of Cartridge 4

Figure 11:
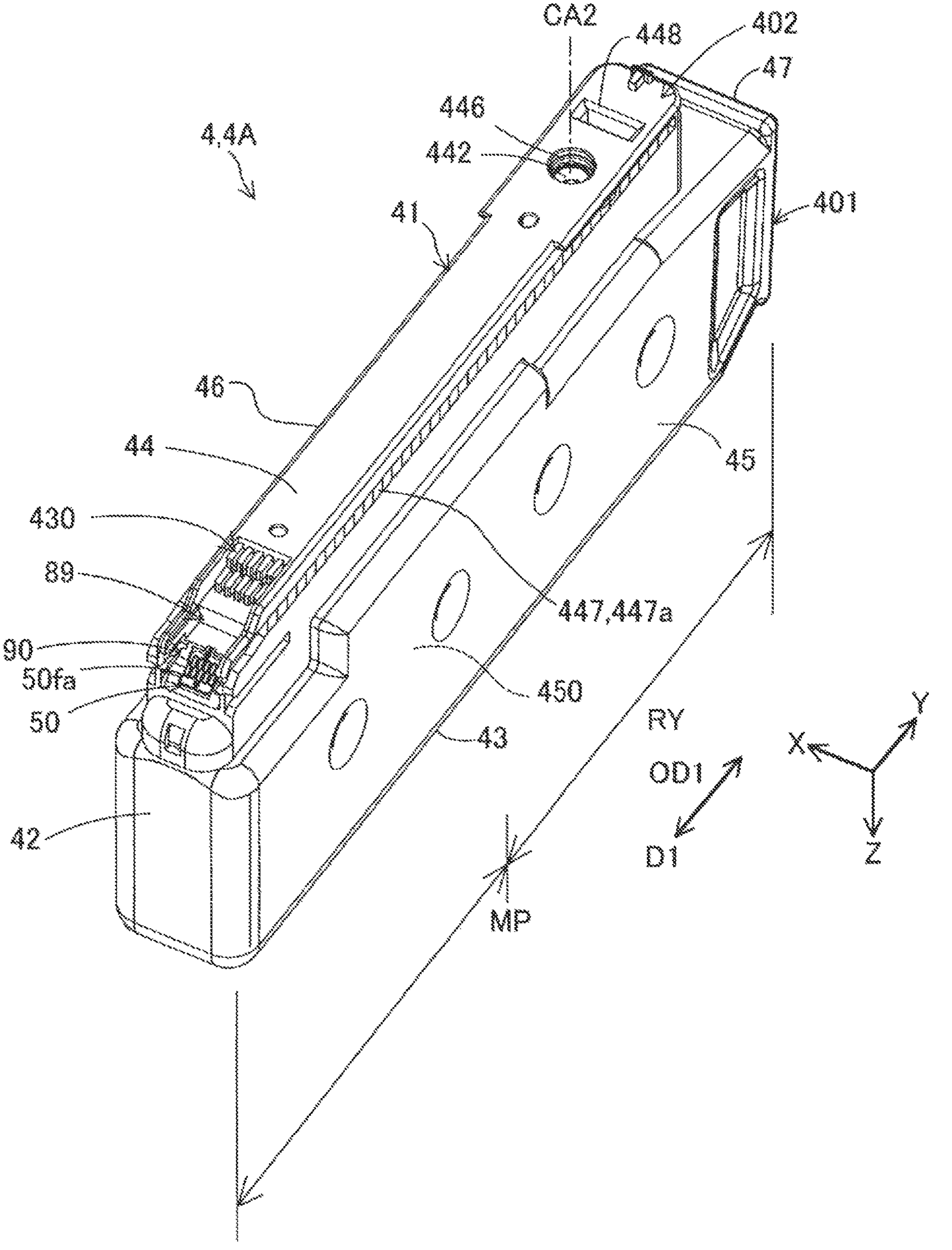
FIG. 11 is a perspective view of a first type of cartridge.
Figure 12:
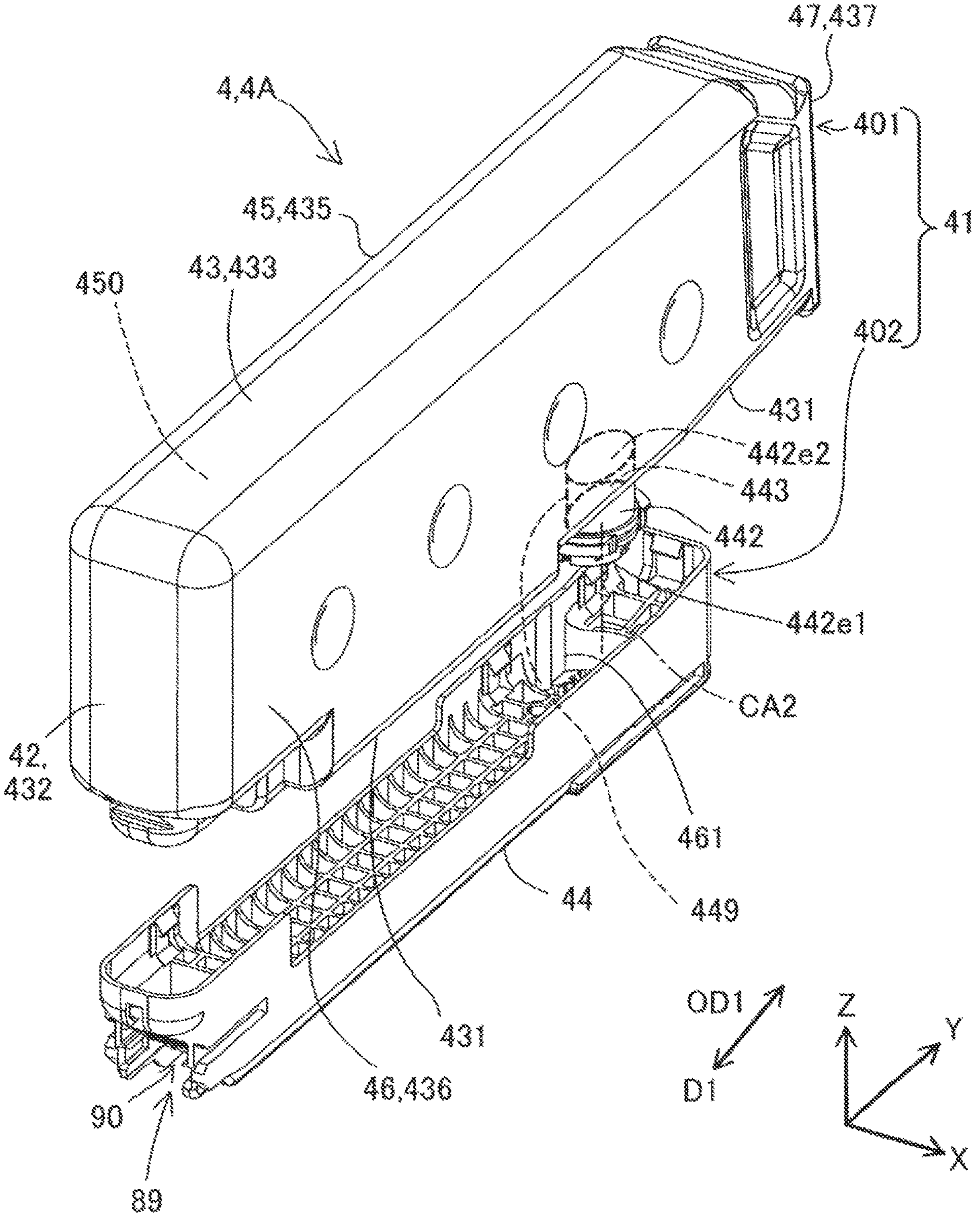
FIG. 12 is an exploded perspective view of the first type of cartridge.
Figure 13:
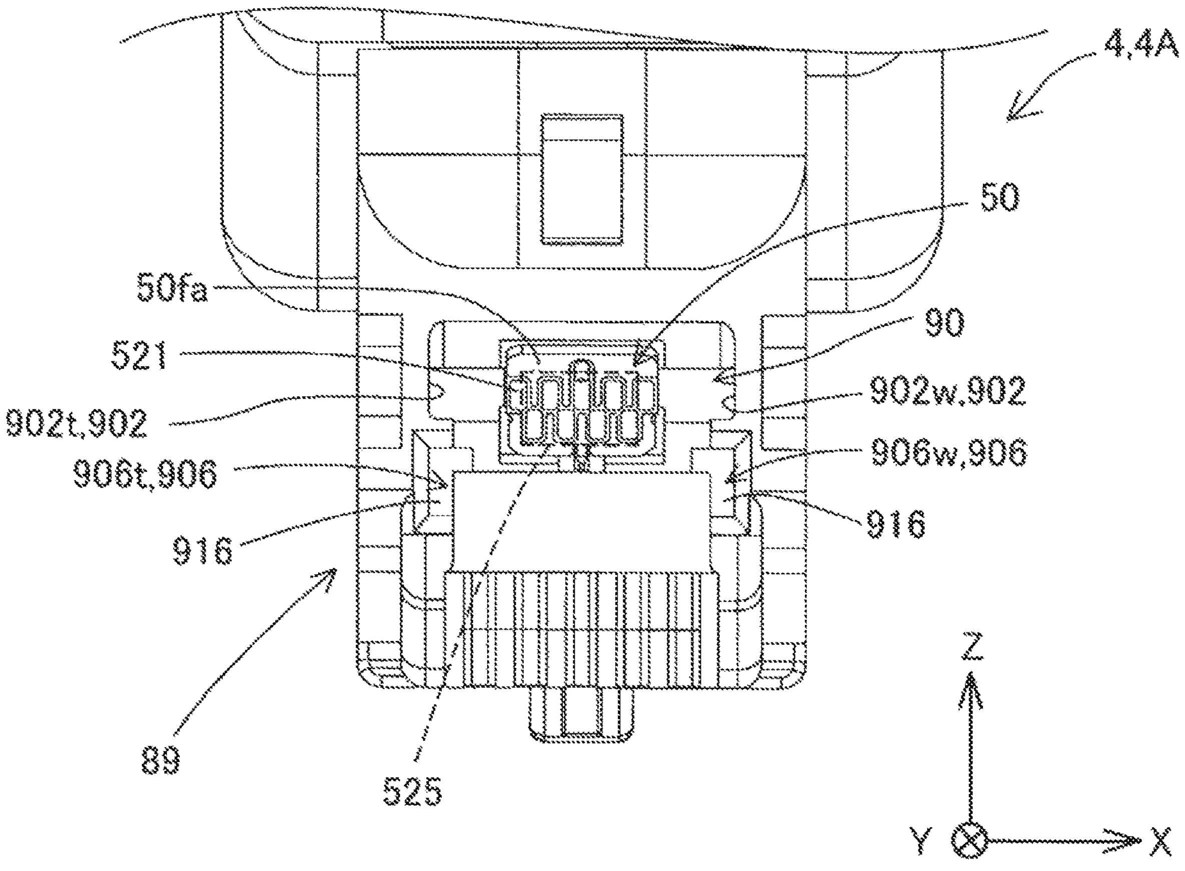
FIG. 13 is a first view illustrating a part of the first type of cartridge.
Figure 14:
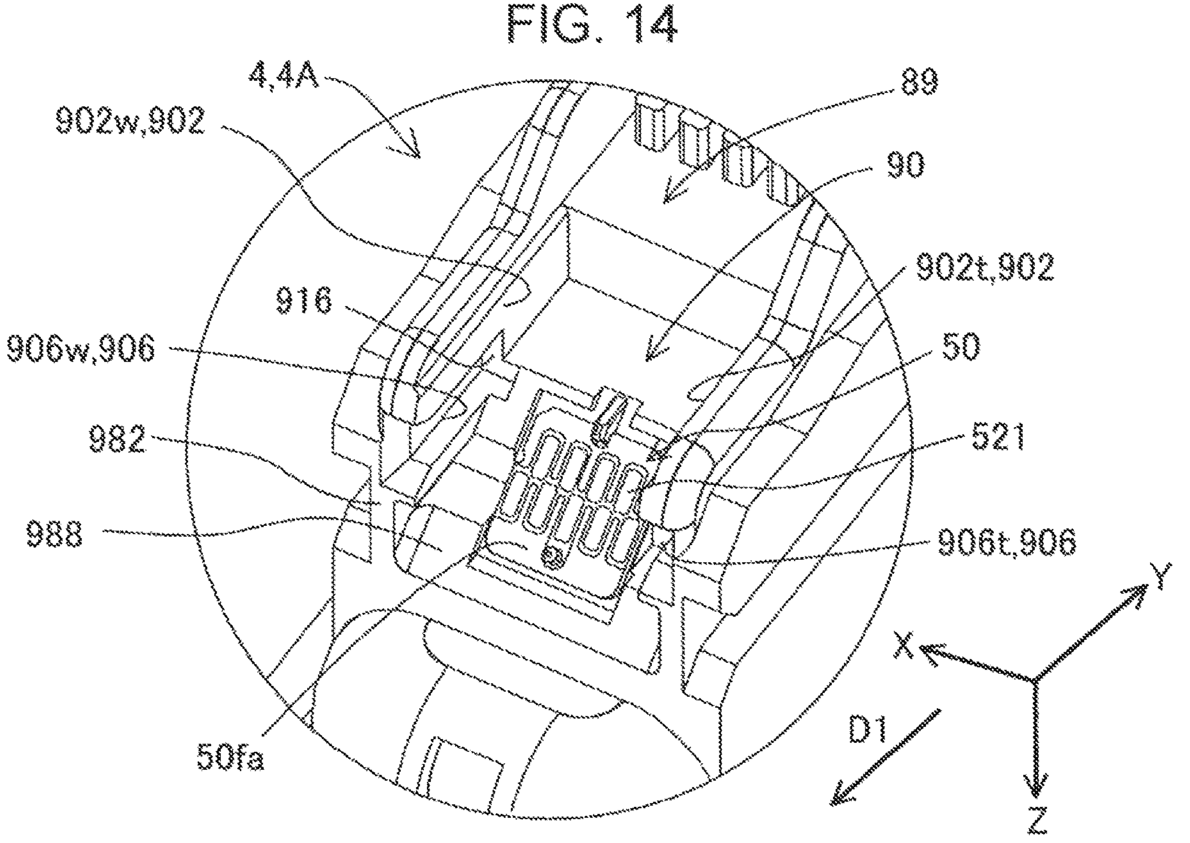
FIG. 14 is a second view illustrating a part of the first type of cartridge.
Figure 15:
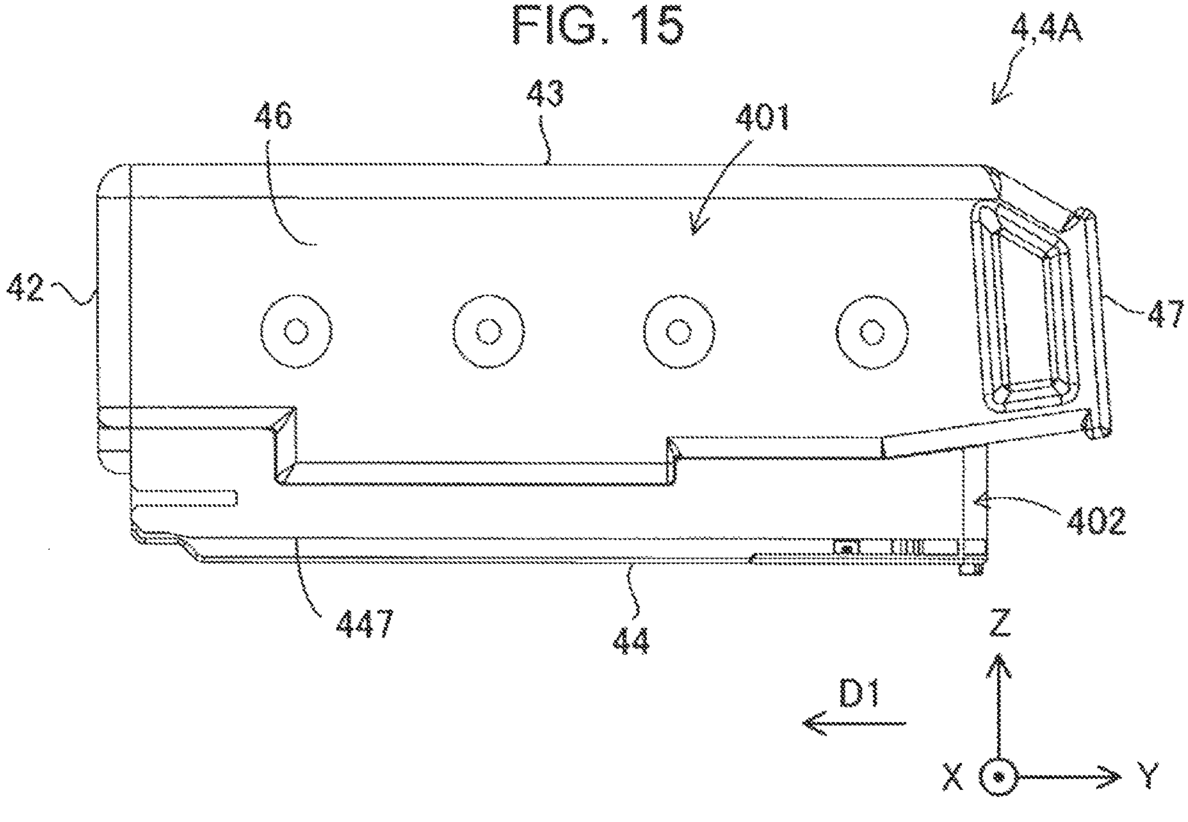
FIG. 15 is a first side view of the first type of cartridge.
Figure 16:
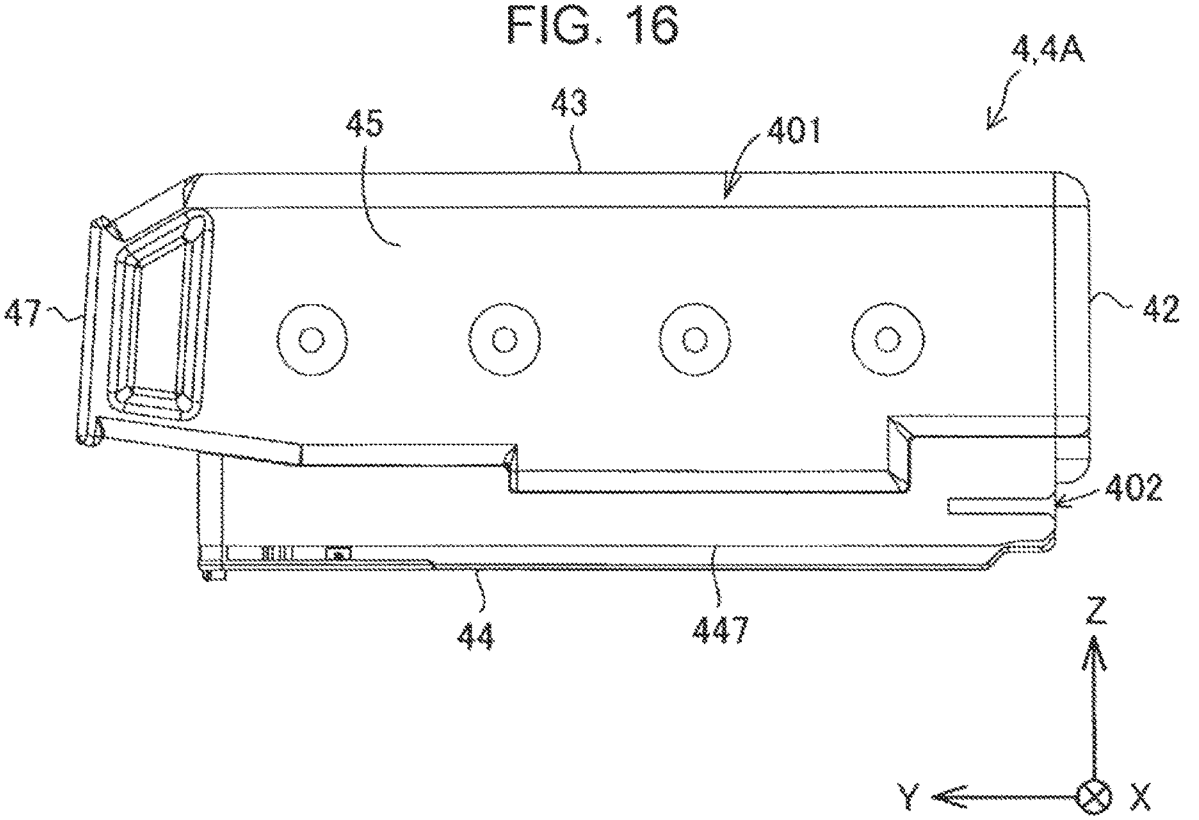
FIG. 16 is a second side view of the first type of cartridge.
Figure 17:
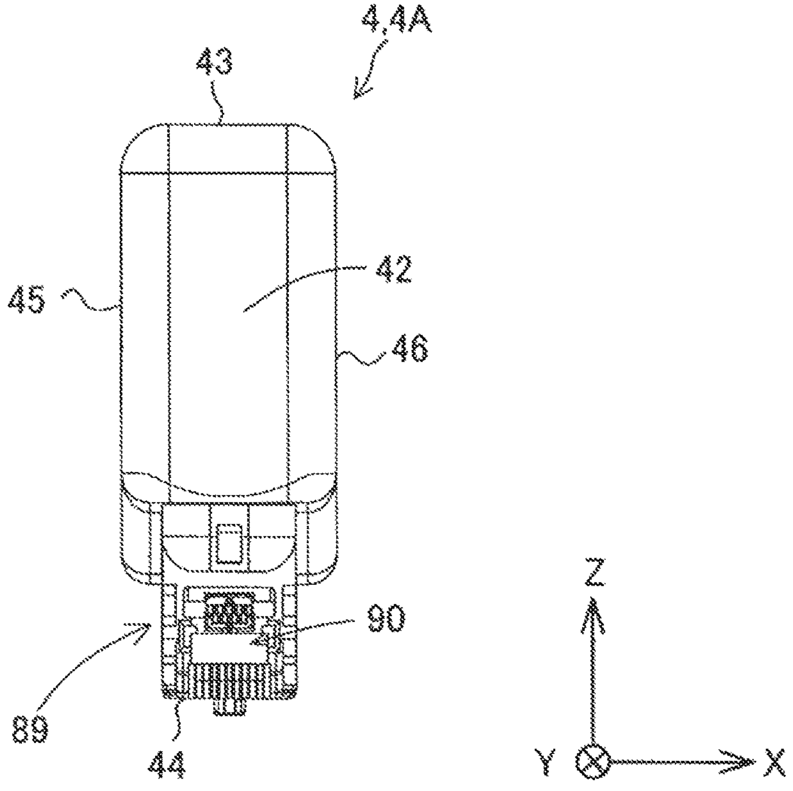
FIG. 17 is a front view of the first type of cartridge.
Figure 18:
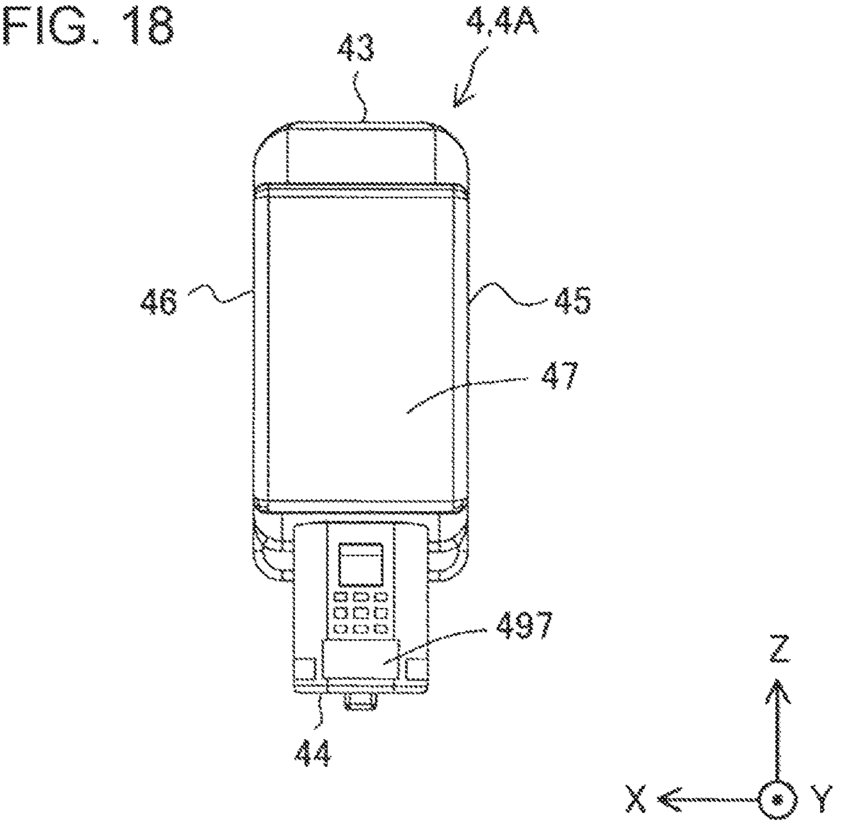
FIG. 18 is a rear view of the first type of cartridge.
Figure 19:
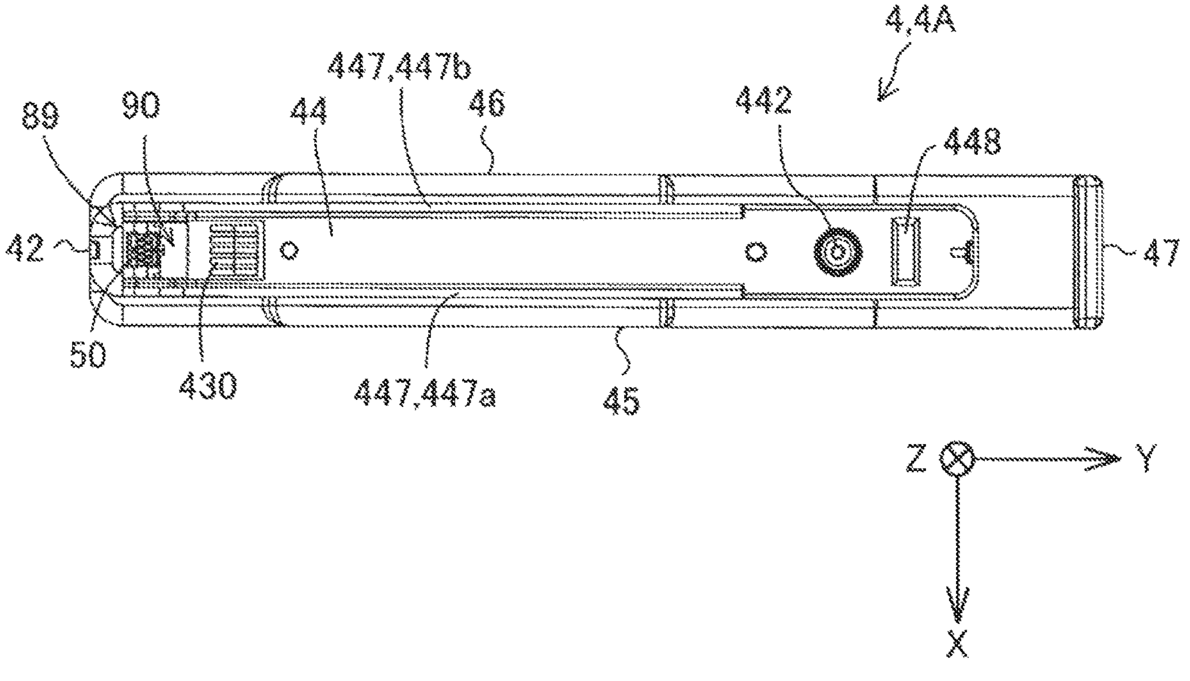
FIG. 19 is a top view of the first type of cartridge.

FIG. 11 is a perspective view of the first type of cartridge 4A. FIG. 12 is an exploded perspective view of the first type of cartridge 4A. FIG. 13 is a first view illustrating a part of the first type of cartridge 4A. FIG. 14 is a second view illustrating a part of the first type of cartridge 4A. FIG. 15 is a first side view of the first type of cartridge 4A. FIG. 16 is a second side view of the first type of cartridge 4A. FIG. 17 is a front view of the first type of cartridge 4A. FIG. 18 is a rear view of the first type of cartridge 4A. FIG. 19 is a top view of the first type of cartridge 4A. Regarding the cartridge 4, the Y direction is a depth direction, the Z direction is a height direction, and the X direction is a width direction. The cartridge 4 is a cartridge that contains a large amount of liquid and has a large outer shape. Regarding the outer shape of the cartridge 4, a dimension in the Y direction is the greatest, and a dimension in the Z direction and a dimension in the X direction are smaller in this order In the drawings illustrating the cartridge 4, the X direction, the Y direction, and the Z direction are based on a state of completion of the terminal connection process, which is a state in which the insertion of the cartridge 4 into the cartridge mounting portion 6 has been completed. That is, in the drawings illustrating the cartridge 4, the X direction, the Y direction, and the Z direction are based on a state before the supply portion coupling process for rotationally moving the support member 610.

As illustrated in FIG. 12, the first type of cartridge 4A includes a liquid container 401 forming a top wall 43 and an adapter 402 forming a bottom wall 44. The adapter 402 is attached to the liquid container 401 by fitting. The liquid container 401 and the adapter 402 are formed of a synthetic resin. The liquid container 401 and the adapter 402 may be formed of the same material or may be formed of different materials. A member forming the liquid container 401 may be lighter than a member forming the adapter 402. This improves operability of the cartridge 4.

As illustrated in FIG. 11, an outer shape of the first type of cartridge 4A is a substantially rectangular parallelepiped shape. The first type of cartridge 4A includes a main body 41 forming an outer shell and a circuit board 50 attached to the main body 41. The main body 41 is comprised of the liquid container 401 and the adapter 402 described above.

The main body 41 of the first type of cartridge 4A has a front wall 42, a rear wall 47, the top wall 43, the bottom wall 44, a first sidewall 45, a second sidewall 46, and a corner portion 89. Each wall 42, 43, 44, 45, 46, and 47 is also referred to as each surface 42, 43, 44, 45, 46, and 47. The front wall 42 and the rear wall 47 face each other in the Y direction along the insertion direction. The top wall 43 and the bottom wall 44 face each other in the Z direction. The Z direction is parallel to the central axis CA2 along an extending direction of the liquid supply portion 442. The first sidewall 45 and the second sidewall 46 face each other in the X direction. That is, an opposed direction OD1, along which the first sidewall 45 and the second sidewall 46 are opposed to each other, is a direction going along the insertion direction D1.

As illustrated in FIG. 15, the front wall 42 is located on the insertion-direction D1 side, toward which the cartridge 4 is inserted into the cartridge mounting portion 6. That is, the front wall 42 forms an insertion leading-end surface on the −Y direction side, which is the insertion-direction D1 side. The rear wall 47 forms a surface on the +Y direction side, toward which removal is performed. The top wall 43 is located on the +Z direction side and intersects the front wall 42 and the rear wall 47. As illustrated in FIG. 11, the bottom wall 44 is located on the −Z direction side, which is the gravity-direction side in the mounted state, and forms a coupling leading-end surface in the coupling direction D2 illustrated in FIG. 3. That is, the bottom wall 44 is located on the coupling-direction D2 side. The bottom wall 44 intersects the front wall 42 and the rear wall 47. An insertion opening 446 is formed in the bottom wall 44. The liquid supply portion 442 is disposed in the insertion opening 446. The liquid supply portion 442 is disposed such that the central axis CA2 of the liquid supply portion 442 passes through the insertion opening 446. In a mounting process of the cartridge 4, the liquid inlet portion 642 of the cartridge mounting portion 6 is inserted through the insertion opening 446. The insertion opening 446 and the liquid supply portion 442 are located in a region RY between a middle portion MP of the cartridge 4 and an end portion on the rear-wall 47 side in the insertion direction.

As illustrated in FIG. 17, the first sidewall 45 is located on the −X direction side, and the second sidewall 46 is located on the +X direction side. Each of the first sidewall 45 and the second sidewall 46 intersects the front wall 42, the rear wall 47, the top wall 43, and the bottom wall 44. The corner portion 89 is provided at a corner where the front wall 42 and the bottom wall 44 intersect each other. The corner portion 89 has a recess portion 90 recessed inward.

The first type of cartridge 4A further includes, as illustrated in FIG. 11, the liquid containing portion 450 containing a liquid, the liquid supply portion 442, a cartridge-side identification member 430, the supply portion positioning portion 448, the circuit board 50, and cartridge guide portions 447. The first type of cartridge 4A further includes the cartridge engaging portion 497 illustrated in FIG. 18.

As illustrated in FIG. 12, the liquid containing portion 450 includes a containing portion front wall 432, a containing portion rear wall 437, a containing portion top wall 433, a containing portion bottom wall 431, a first containing portion sidewall. 435, and a second containing portion sidewall 436. An outer shell of the liquid containing portion 450 is formed of these walls 431 to 436.

The containing portion front wall 432 is a part of the front wall 42. The containing portion front wall 432 is located on the insertion-direction D1 side. That is, the containing portion front wall 432 forms a leading-end surface on the insertion-direction D1 side. The containing portion rear wall 437 is a part of the rear wall 47. The containing portion rear wall 437 faces the containing portion front wall 432. The opposed direction OD1, in which the containing portion rear wall 437 and the containing portion front wall 432 face each other, is a direction orthogonal to the central axis CA2 and going along the insertion direction D1.

The containing portion bottom wall 431 intersects the containing portion front wall 432 and the containing portion rear wall 437. The containing portion bottom wall 431 forms the bottom surface of the liquid containing portion 450 on the −Z direction side. The liquid supply portion 442 is disposed in the containing portion bottom wall 431. The containing portion top wall 433 is the same as the top wall 43. The containing portion top wall 433 faces the containing portion bottom wall 431. The containing portion top wall 433 intersects the containing portion front wall 432 and the containing portion rear wall 437.

The first containing portion sidewall 435 is a part of the first sidewall 45. The second containing portion sidewall 436 is a part of the second sidewall 46. The first containing portion sidewall 435 and the second containing portion sidewall 436 intersect the containing portion front wall 432, the containing portion rear wall 437, the containing portion top wall 433, and the containing portion bottom wall 431.

The liquid supply portion 442 illustrated in FIG. 12 communicates with the liquid containing portion 450 and has the central axis CA2. The direction along the central axis CA2 is the Z direction. The direction along the central axis CA2, in which the liquid supply portion 442 extends, intersects the −Y direction, which is the insertion direction D1. In the present embodiment, the central axis CA2 is orthogonal to the insertion direction D1. That is, the liquid supply portion 442 extends in the direction orthogonal to the insertion direction, namely, extends in the Z direction in the present embodiment. The liquid supply portion 442 is a cylindrical member that protrudes from the containing portion bottom wall 431 of the liquid containing portion 450 toward the adapter 402. The liquid supply portion 442 is disposed in a recess-shaped supply portion disposing chamber 461 of the adapter 402. The insertion opening 446 illustrated in FIG. 11 is formed at a recessed-shaped bottom portion of the supply portion disposing chamber 461.

As illustrated in FIG. 12, the liquid supply portion 442 has an internal flow passage 449 and supplies the liquid of the liquid containing portion 450 to the liquid inlet portion 642, which is an external portion. A supply base end portion 442*e*2, which is a base end portion of the liquid supply portion 442, is located inside the liquid containing portion 450. A supply tip portion 442*e*1, which is a tip portion of the liquid supply portion 442, opens toward the outside. A non-illustrated valve mechanism that opens/closes the internal flow passage 449 is disposed in the internal flow passage 449 of the liquid supply portion 442. The valve mechanism has a valve seat, a valve body, and an urging member in this order from the supply tip portion 442*e*1. The valve seat is an annular member formed of rubber or elastomer. The valve body is a columnar member and closes a valve hole formed in the valve seat. The urging member is a coil spring that urges the valve body toward the valve seat. In the mounted state of the cartridge 4, the liquid inlet portion 642 pushes the valve body in a direction away from the valve seat, thereby opening the valve mechanism. The liquid supply portion 442 has a liquid flowing-in port 443 between the supply base end portion 442*e*2 and the supply tip portion 442*e*1. The liquid flowing-in port 443 is a circular opening formed in the containing portion bottom wall 431. The liquid of the liquid containing portion 450 flows into the liquid flowing-in port 443 through an opening portion formed in the sidewall of the valve body. The liquid flowing-in port 443 is a part of the internal flow passage 449.

The cartridge-side identification member 430 illustrated in FIG. 11 is used for identifying whether or not the cartridge 4 has been inserted into the correct slot 61C, 61M, 61Y, or 61K of the cartridge mounting portion 6. The cartridge-side identification member 430 is comprised of ribs and is disposed on the bottom wall 44 at the side close to the front wall 42, that is, at a location adjacent to the corner portion 89 in the present embodiment. The cartridge-side identification members 430 form different pattern shapes corresponding to the colors of the liquids contained in the cartridges 4C, 4M, 4Y, and 4K. The pattern shape is determined by the number and locations of the ribs.

The supply portion positioning portion 448 receives the apparatus-side supply portion positioning portion 644 to perform positioning of the liquid supply portion 442 with respect to the liquid inlet portion 642. Specifically, in the supply portion coupling process, the supply portion positioning portion 448 performs positioning of the liquid supply portion 442 with respect to the liquid inlet portion 642 by receiving the apparatus-side supply portion positioning portion 644 for restricting the movement of the supply portion positioning portion 448 in a direction intersecting the coupling direction D2. The supply portion positioning portion 448 is a recess portion formed in the bottom wall 44 and recessed from an outer surface of the bottom wall 44. In another embodiment, the supply portion positioning portion 448 may be a hole penetrating through the bottom wall 44. The supply portion positioning portion 448 is a recess portion having a substantially rectangular parallelepiped shape, and an opening area of an entrance portion formed on an outer surface side of the bottom wall 44 is greater than an opening area on a bottom side of the recess portion, which is a side deeper than the entrance portion. This configuration enables the supply portion positioning portion 448 to easily receive the apparatus-side supply portion positioning portion 644 in the supply portion coupling process. With regard to the insertion direction D1, the supply portion positioning portion 448 is located on the opposite side away from the cartridge-side terminals 521 of the circuit board 50, with the liquid supply portion 442 and the insertion opening 446 interposed therebetween. In the present embodiment, the supply portion positioning portion 448 is formed in the vicinity of the rear wall 47 in the bottom wall 44.

As illustrated in FIG. 18, the cartridge engaging portion 497 is provided in the rear wall 47. The cartridge engaging portion 497 is a recess portion recessed from an outer surface of the rear wall 47.

As illustrated in FIG. 13, the circuit board 50 is disposed at the corner portion 89. The circuit board 50 has a plurality of cartridge-side terminals 521 disposed on its front surface 50*fa* and a storage device 525 disposed on its back. The plurality of cartridge-side terminals 521, which can be electrically connected to the apparatus-side terminals by contact therewith, are electrically connected to the storage device 525 via wiring. In the present embodiment, the number of the plurality of cartridge-side terminals 521 provided is nine. The front surface 50*fa*, on which the plurality of cartridge-side terminals 521 are disposed, is inclined with respect to the insertion direction D1. Specifically, the front surface 50*fa* is inclined with respect to the insertion direction toward a direction including a −Z direction component and a −Y direction component. The storage device 525 stores information regarding the cartridge 4, for example, the date of manufacture and the remaining amount of liquid. In the mounted state, the plurality of cartridge-side terminals 521 are electrically connected to the corresponding apparatus-side terminals 721 by being in contact with the corresponding apparatus-side terminals 721. Therefore, the control unit 31 of the printing apparatus 10 and the storage device 525 are electrically connected to each other, and data communication can be performed therebetween.

As illustrated in FIG. 14, the circuit board 50 is disposed in the recess portion 90 of the corner portion 89. As illustrated in FIG. 11, the recess portion 90 is provided over the front wall 42 and the bottom wall 44. As illustrated in FIG. 14, the recess portion 90 has a recess portion front wall 982 forming an entrance opening located on the front-wall 42 side, a recess portion bottom wall 988 forming a bottom portion of the recess portion 90, and a pair of recess portion sidewalls 902*t* and 902*w*.

The recess portion bottom wall 988 has a portion inclined with respect to the Y direction. In the present embodiment, the inclined portion is sloped in such a way as to be located more on the +Z direction side as it goes toward the recess portion front wall 982 with respect to the Y direction. The circuit board 50 is disposed on this inclined portion.

The pair of recess portion sidewalls 902*t* and 902*w* are walls connected to the recess portion bottom wall 988. The pair of recess portion sidewalls 902*t* and 902*w* face each other in the X direction. The first recess portion sidewall 902*t* is connected to a −X-direction-side end portion of the recess portion bottom wall 988. The second recess portion sidewall 902*w* is connected to a +X-direction-side end portion of the recess portion bottom wall 988. The first recess portion sidewall 902*t* and the second recess portion sidewall 902*w* are referred to as a recess portion sidewall 902 when no distinction is made therebetween. An entrance opening formed as an opening in the recess portion front wall 982 serves as an entrance when the apparatus-side terminal portion 70 is inserted into the recess portion 90.

The pair of recess portion sidewalls 902*t* and 902*w* are provided with a pair of terminal positioning portions 906*t* and 906*w*, respectively. The pair of terminal positioning portions 906*t* and 906*w* are provided such that they face each other in the X-axis direction. The pair of terminal positioning portions 906*t* and 906*w* are also referred to as a first terminal positioning portion 906*t* and a second terminal positioning portion 906*w* when a distinction is made therebetween. The pair of terminal positioning portions 906*t* and 906*w* are also referred to as a terminal positioning portion 906 when no distinction is made therebetween. The terminal positioning portion 906 is a groove formed in the recess portion sidewall 902. The first terminal positioning portion 906*t* is a groove having a shape recessed from a surface of the first recess portion sidewall 902*t*. The second terminal positioning portion 906*w* is a groove having a shape recessed from a surface of the second recess portion sidewall 902*w*.

The first terminal positioning portion 906*t* receives the first apparatus-side terminal positioning portion 756*t* illustrated in FIG. 9 in the terminal connection process. That is, the first apparatus-side terminal positioning portion 756*t* is inserted into the first terminal positioning portion 906*t*. The second terminal positioning portion 906*w* receives the second apparatus-side terminal positioning portion 756*w* illustrated in FIG. 9 in the terminal connection process. That is, the second apparatus-side terminal positioning portion 756*w* is inserted into the second terminal positioning portion 906*t*. The insertion of the apparatus-side terminal positioning portion 756 into the terminal positioning portion 906 is performed after the mating of the cartridge-side identification member 430 and the apparatus-side identification member 630 has been started. The insertion of the apparatus-side terminal positioning portion 756 into the terminal positioning portion 906 is started before the contact between the apparatus-side terminals 721 and the cartridge-side terminals 521 is started.

Due to receiving the apparatus-side terminal positioning portion 756 by the terminal positioning portion 906, the apparatus-side terminal positioning portion 756 and the terminal positioning portion 906 come into contact with each other. As a result, the movement of the cartridge-side terminals 521 with respect to the apparatus-side terminals 721 in the Z direction and the X direction, which are the directions intersecting the insertion direction, is restricted. Because of the restriction of the movement, positioning of the cartridge-side terminals 521 with respect to the apparatus-side terminals 721 in the Z direction and the X direction, which are the directions intersecting the insertion direction, is performed. The terminal positioning portion 906 has an end wall 916 on the +Y direction side. The cartridge 4 is further pushed in the insertion direction D1 from an abutting position where a tip portion of the apparatus-side terminal positioning portion 756 abuts on the end wall 916, and, as a result, the terminal connection process is completed. Since the cartridge 4 is further pushed in the insertion direction D1 from the abutting position, the holding mechanism 73 illustrated in FIG. 4 is pushed in the insertion direction D1. Therefore, the apparatus-side terminal portion 70 moves in the insertion direction D1 in accordance with the movement of the cartridge 4. Therefore, in a state in which the terminal connection process is completed, the urging member 780 illustrated in FIG. 4 is in a compressed state. In addition, in the state in which the terminal connection process is completed, the apparatus-side terminals 721 and the cartridge-side terminals 521 are in contact with each other.

As illustrated in FIGS. 11 and 19, the cartridge guide portions 447 extend in the insertion direction D1. The cartridge guide portions 447 are guided in the insertion direction D1 by the apparatus guide portions 602 of the cartridge mounting portion 6. The cartridge guide portions 447 are formed on the first sidewall 45 and the second sidewall 46, respectively. In FIG. 11, the cartridge guide portion 447 formed on the first sidewall 45 is illustrated with single hatching for easier understanding. The cartridge guide portions 447 are formed on the first sidewall 45 and the second sidewall 46, respectively, by steps. That is, with regard to the width of the cartridge 4, one part including the bottom wall 44 is narrower than the other part that is more distant from the bottom wall 44 than the one part. Therefore, the step forming the cartridge guide portion 447 is formed. The cartridge guide portion 447 is a surface facing the −Z direction. The cartridge guide portion 447 formed on the first sidewall 45 is also referred to as a first cartridge guide portion 447*a*, and the cartridge guide portion 447 formed on the second sidewall 46 is also referred to as a second cartridge guide portion 447*b*.

When the cartridge 4 is inserted into the cartridge mounting portion 6, the cartridge guide portion 447 is in contact with the +Z-direction-side surface of the apparatus guide portion 602, thereby guiding the movement of the cartridge 4 in the insertion direction D1 in a state in which a posture of the cartridge 4 is maintained. In the process of insertion of the cartridge 4 into the accommodation space 61, the +Z-direction-side surface of the first apparatus guide portion 602*a* is in contact with the first cartridge guide portion 447*a*, and the +Z-direction-side surface of the second apparatus guide portion 602*b* is in contact with the second cartridge guide portion 447*b*.

As illustrated in FIGS. 11 and 12, the adapter 402 includes the corner portion 89 having the terminal positioning portion 906 and the cartridge-side terminals 521, the cartridge-side identification member 430, the insertion opening 446, the supply portion positioning portion 448, the cartridge guide portions 447, and the supply portion disposing chamber 461.

Figure 20:
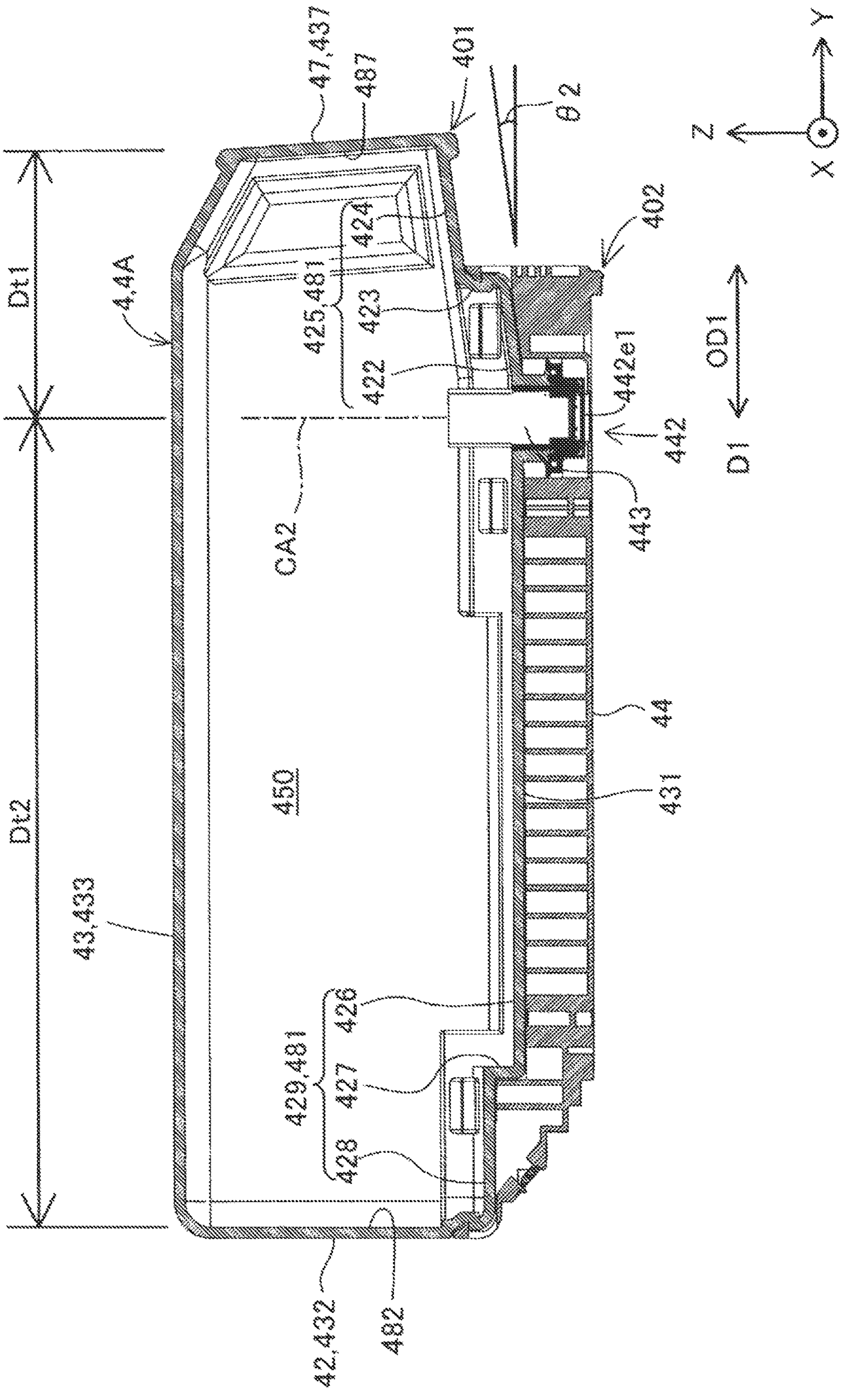
FIG. 20 is a sectional view of the first type of cartridge.

FIG. 20 is a sectional view of the first type of cartridge 4A. In FIG. 20, the valve mechanism disposed inside the liquid supply portion 442 is not illustrated. With reference to FIG. 20, a detailed configuration of the liquid containing portion 450 will now be explained. The inner surface of the containing portion front wall 432 will be referred to as a front wall inner surface 482. The inner surface of the containing portion rear wall 437 will be referred to as a rear wall inner surface 487. The inner surface of the containing portion bottom wall 431 will be referred to as a bottom wall inner surface 481.

In the insertion direction D1, a first distance Dt1, which is the distance between the liquid flowing-in port 443 and the rear wall inner surface 487, is shorter than a second distance Dt2, which is the distance between the liquid flowing-in port 443 and the front wall inner surface 482. In the present embodiment, the first distance Dt1 is less than half the second distance Dt2. In the present embodiment, the reference position of the liquid flowing-in port 443 for the first distance Dt1 and the second distance Dt2 is the central axis CA2.

In the insertion direction D1, the bottom wall inner surface 481 includes a rear-wall-side inner surface 425, which is located between the liquid flowing-in port 443 and the containing portion rear wall 437, and a front-wall-side inner surface 429, which is located between the liquid flowing-in port 443 and the containing portion front wall 432.

The rear-wall-side inner surface 425 includes a first bottom wall inner surface 422, a first level difference surface 423, and a first end portion inner surface 424. The first bottom wall inner surface 422 is a surface connected to the liquid flowing-in port 443. In the insertion direction D1, the first level difference surface 423 is located between the first bottom wall inner surface 422 and the first end portion inner surface 424 and links the first bottom wall inner surface 422 and the first end portion inner surface 424. One end of the first level difference surface 423 is connected to the first bottom wall inner surface 422. The other end of the first level difference surface 423 is connected to the first end portion inner surface 424. In the insertion direction D1, the first end portion inner surface 424 is located on the opposite side in relation to the first bottom wall inner surface 422, with the first level difference surface 423 interposed therebetween. The first end portion inner surface 424 is a surface connected to the rear wall inner surface 487.

The rear-wall-side inner surface 425 is inclined with respect to the insertion direction D1 such that a slope goes outward in relation to the liquid containing portion 450, that is, farther on a protruding-direction side of the liquid supply portion 442, toward the liquid flowing-in port 443. That is, each of the first bottom wall inner surface 422, the first level difference surface 423, and the first end portion inner surface 424, which constitute the rear-wall-side inner surface 425, is inclined with respect to the insertion direction D1 such that the slope goes outward in relation to the liquid containing portion 450 toward the liquid flowing-in port 443. In other words, the rear-wall-side inner surface 425 is inclined such that a position on and along the slope goes toward the −Z direction side, that is, in the direction from the containing portion top wall 433 toward the containing portion bottom wall 431, as it goes toward the liquid flowing-in port 443.

This relationship in inclination remains the same also in the mounted state, in which the cartridge 4 is mounted in the cartridge mounting portion 6. That is, when the cartridge 4 is in the mounted state, each of the first bottom wall inner surface 422, the first level difference surface 423, and the first end portion inner surface 424, which constitute the rear-wall-side inner surface 425, is inclined with respect to the insertion direction D1 such that the slope goes outward in relation to the liquid containing portion 450 toward the liquid flowing-in port 443. In order to satisfy this relationship in inclination, the angle of inclination, which is an angle formed by the insertion direction D1, or the opposed direction OD1 along the insertion direction D1, and the rear-wall-side inner surface 425 is set to be greater than the rotation angle θ1, by which rotation is performed at the time of coupling the liquid supply portion 442 to the liquid inlet portion 642. For example, the angle of inclination θ2, which is an angle formed by the first bottom wall inner surface 422 and the first end portion inner surface 424 and the insertion direction D1, is set to be 8°. Therefore, in the mounted state of the cartridge 4, the first bottom wall inner surface 422 and the first end portion inner surface 424 are inclined with respect to the horizontal direction by 3°, thereby forming a downward slope toward the liquid flowing-in port 443.

The front-wall-side inner surface 429 includes a second bottom wall inner surface 426, a second level difference surface 427, and a second end portion inner surface 428. The second bottom wall inner surface 426 is a surface connected to the liquid flowing-in port 443. In the insertion direction D1, the second level difference surface 427 is located between the second bottom wall inner surface 426 and the second end portion inner surface 428 and links the second bottom wall inner surface 426 and the second end portion inner surface 428. One end of the second level difference surface 427 is connected to the second bottom wall inner surface 426. The other end of the second level difference surface 427 is connected to the second end portion inner surface 428. In the insertion direction D1, the second end portion inner surface 428 is located on the opposite side in relation to the second bottom wall inner surface 426, with the second level difference surface 427 interposed therebetween. The second end portion inner surface 428 is a surface connected to the front wall inner surface 482.

Each of the second bottom wall inner surface 426 and the second end portion inner surface 428 extends in a direction orthogonal to the central axis CA2. The second level difference surface 427 extends in a direction along the central axis CA2. As described earlier, the rear-surface 47 side is rotated downward when the liquid supply portion 442 is coupled to the liquid inlet portion 642. Therefore, in the mounted state of the cartridge 4, each of the second bottom wall inner surface 426 and the second end portion inner surface 428 is sloped down toward the liquid flowing-in port 443 with respect to the horizontal direction.

Figure 21:
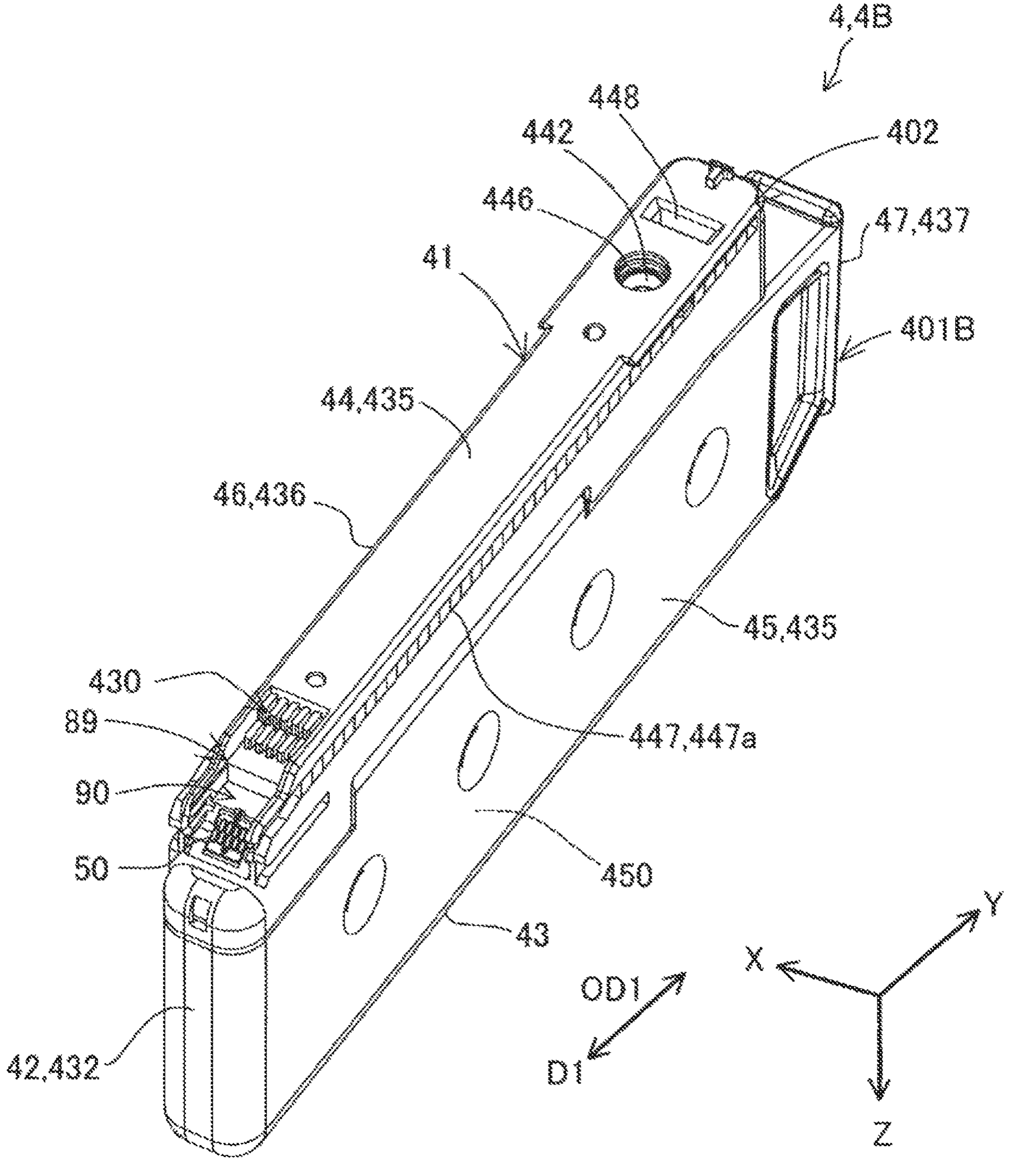
FIG. 21 is a perspective view of a second type of cartridge.
Figure 22:
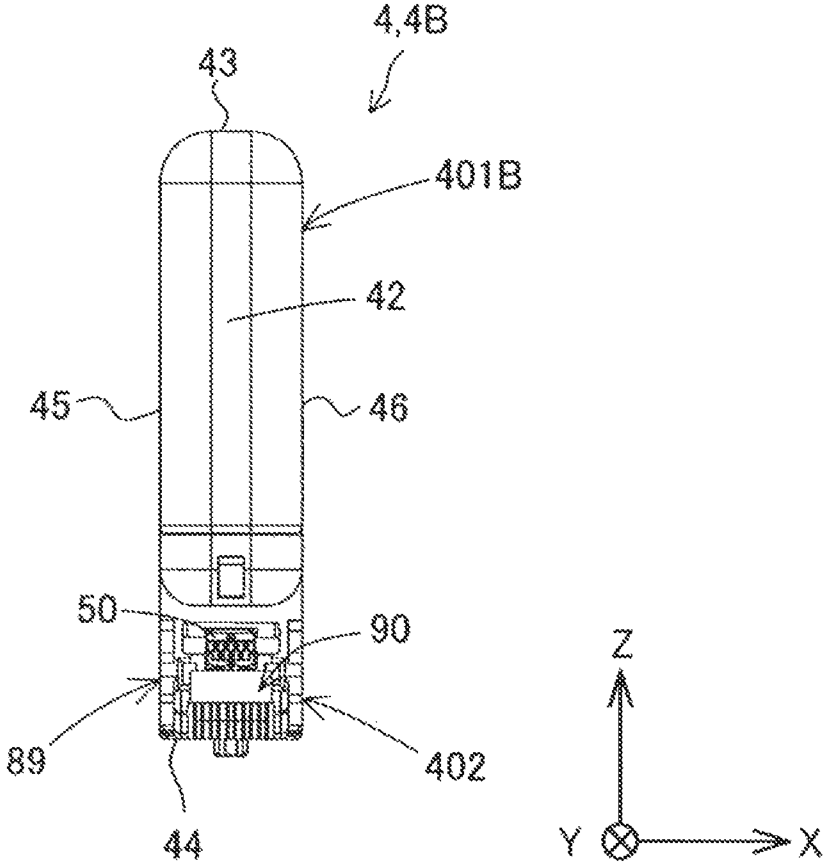
FIG. 22 is a front view of the second type of cartridge.
Figure 23:
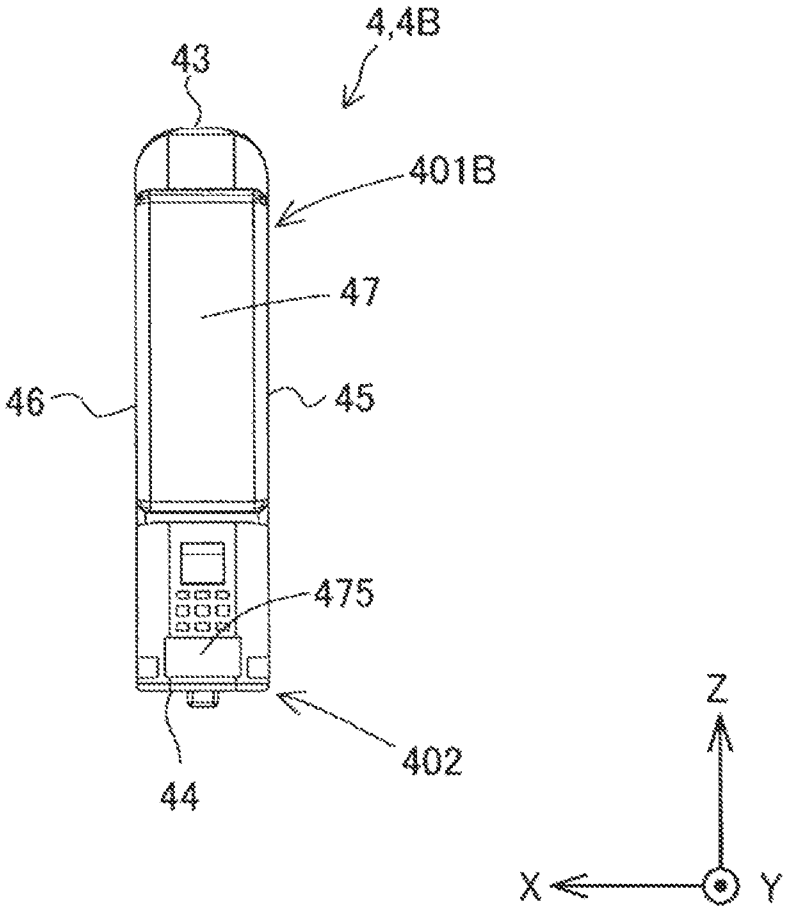
FIG. 23 is a rear view of the second type of cartridge.

FIG. 21 is a perspective view of the second type of cartridge 4B. FIG. 22 is a front view of the second type of cartridge 4B. FIG. 23 is a rear view of the second type of cartridge 4B. The difference between the second type of cartridge 4B and the first type of cartridge 4A lies in that a width of a liquid container 401B is smaller than that of the liquid container 401 illustrated in FIG. 11. Because of this difference, an amount of liquid that can be contained in a liquid containing portion 450 formed in the liquid container 401B is smaller than an amount of liquid that can be contained in the liquid containing portion 450 formed in the liquid container 401. Since the other components of the second type of cartridge 4B are the same as those of the first type of cartridge 4A, the same components will be denoted by the same reference numerals, and a description thereof will be omitted.

An adapter 402 of the second type of cartridge 4B has the same configuration as the adapter 402 of the first type of cartridge 4A except for a pattern shape formed by a cartridge-side identification member 430. Therefore, the adapter 402 can be used in common for the cartridges 4A and 4B having different capacities.

A-5. Mounting Process of Cartridge into Cartridge Mounting Portion

Figure 24:
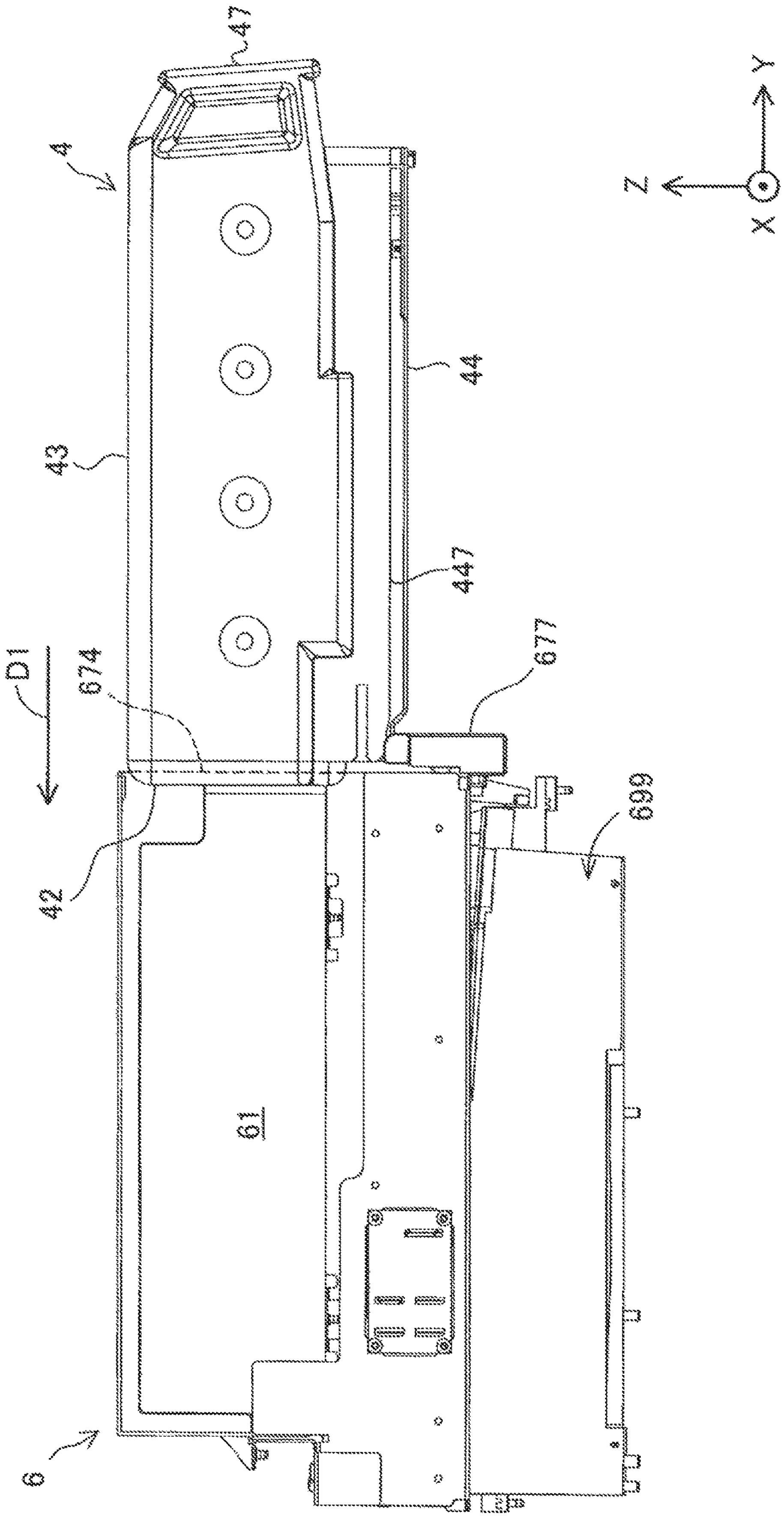
FIG. 24 is a first view for explaining a mounting process.
Figure 25:
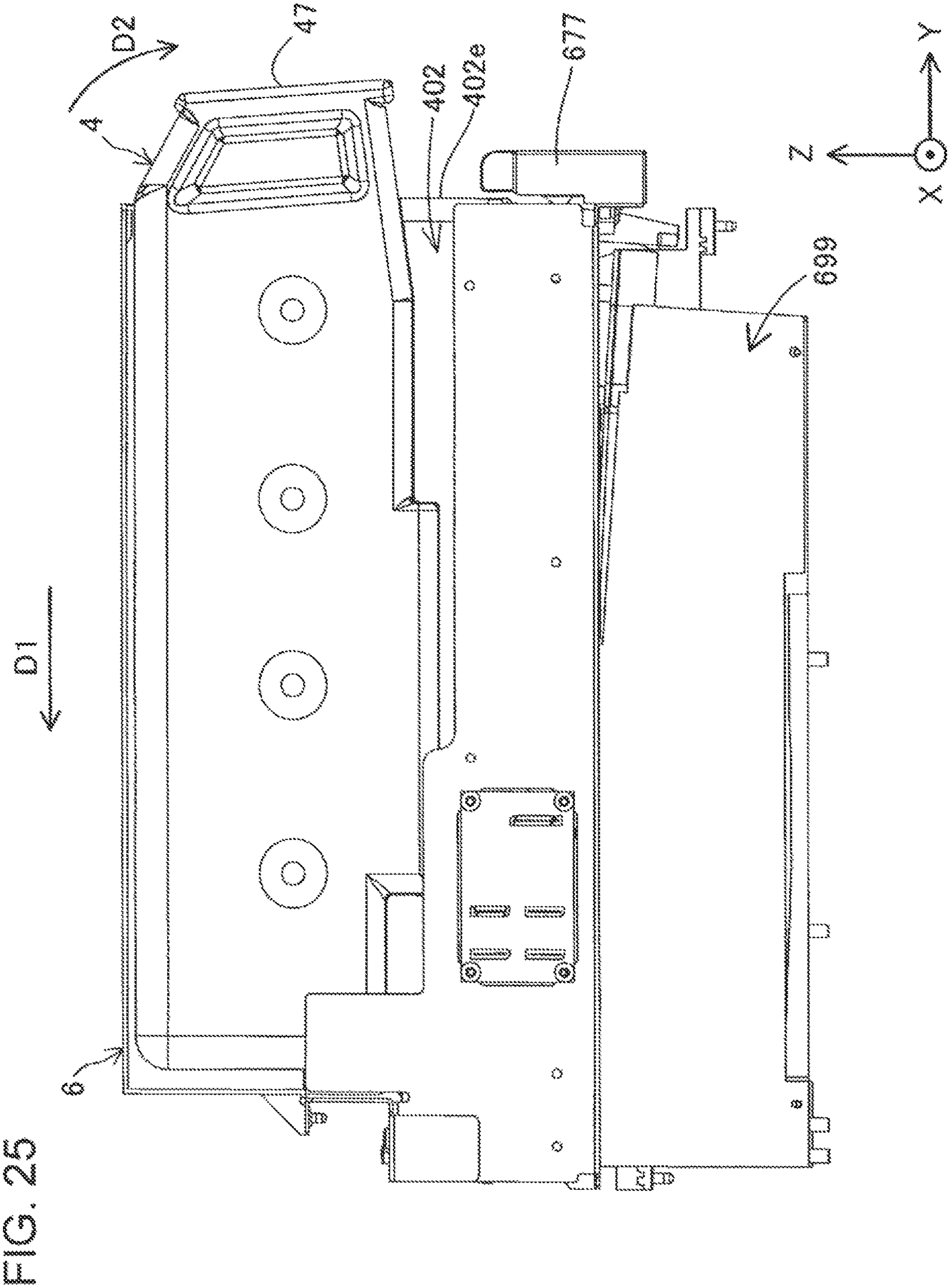
FIG. 25 is a second view for explaining the mounting process.
Figure 26:
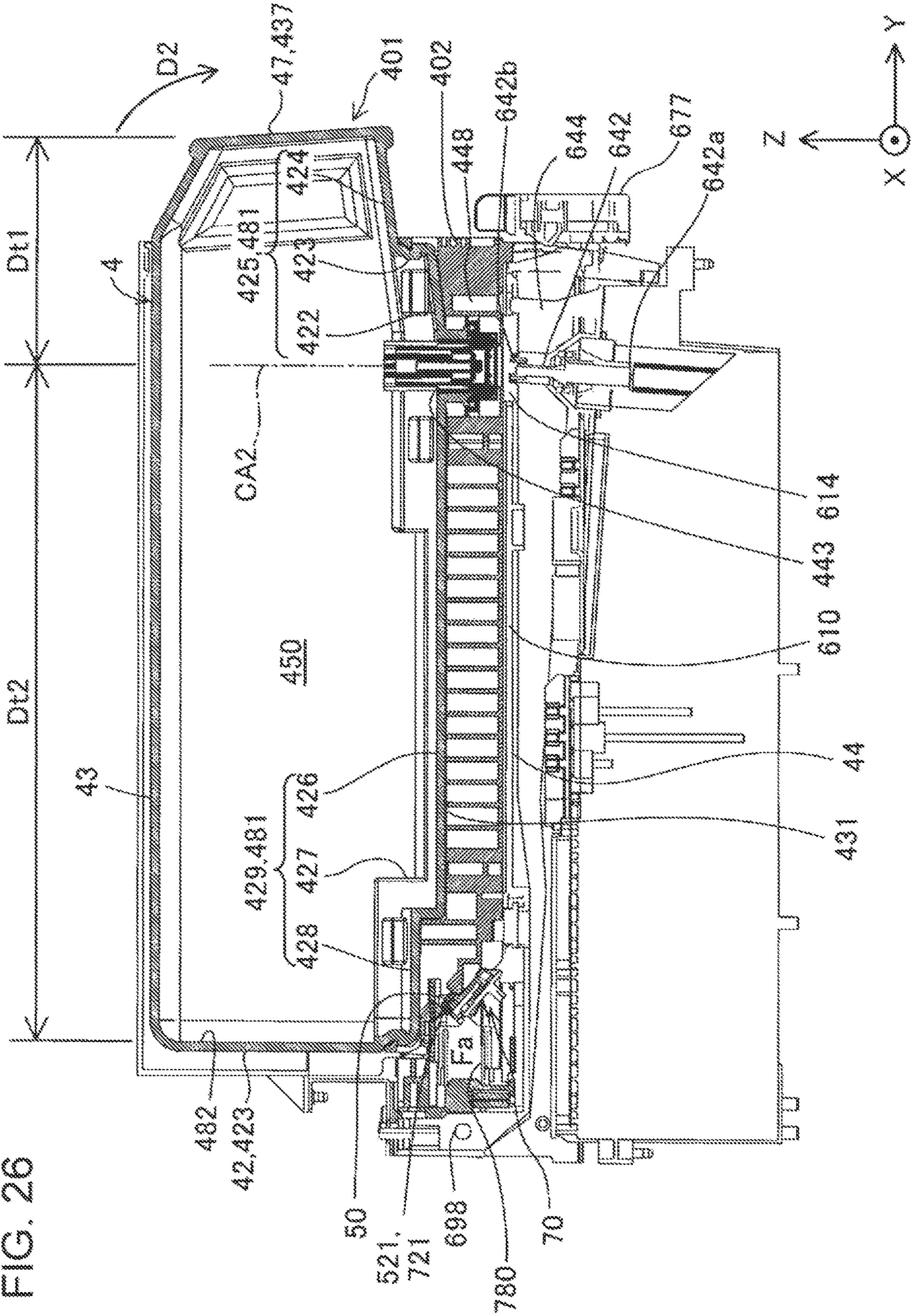
FIG. 26 is a sectional view of FIG. 25.
Figure 27:
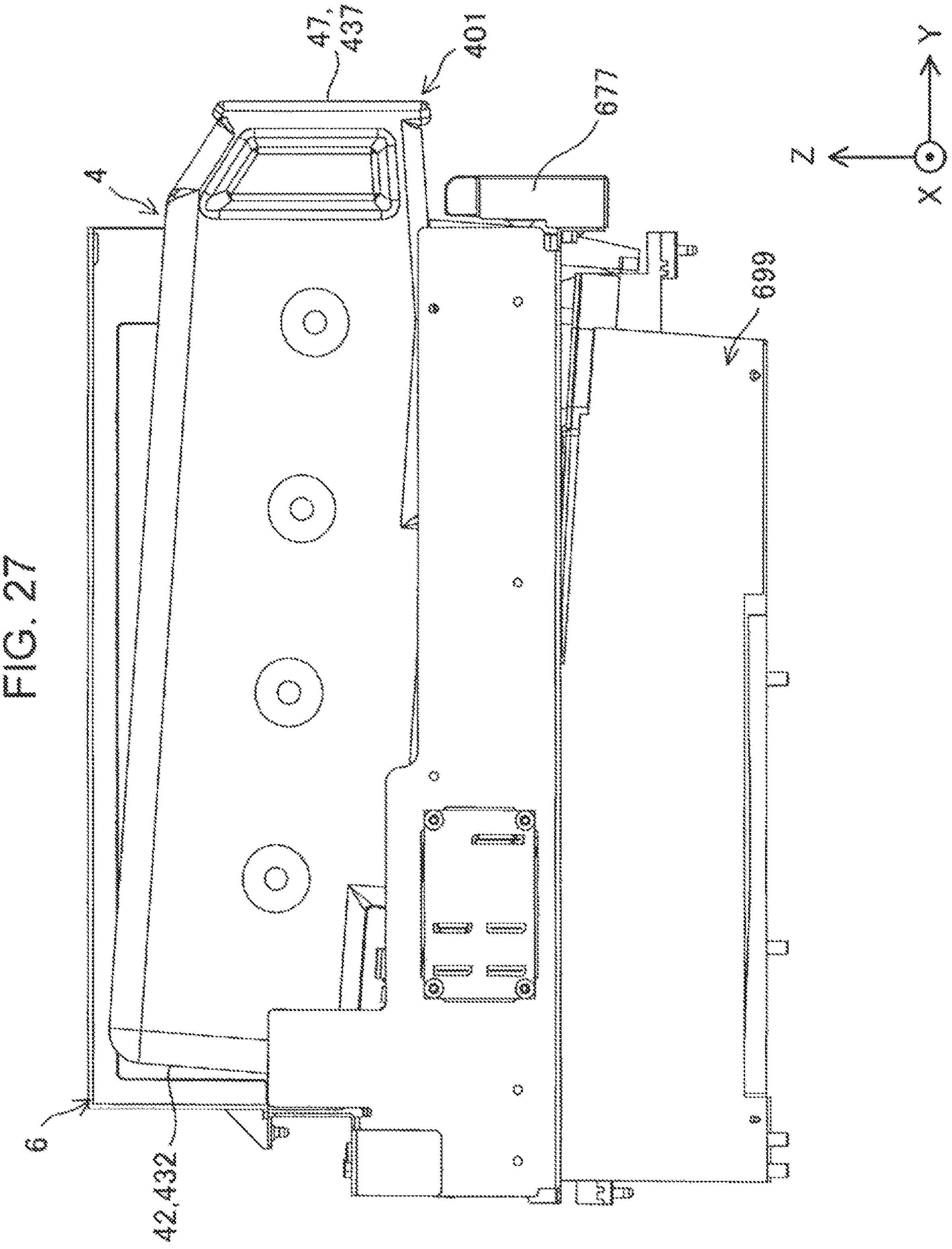
FIG. 27 is a third view for explaining the mounting process.
Figure 28:
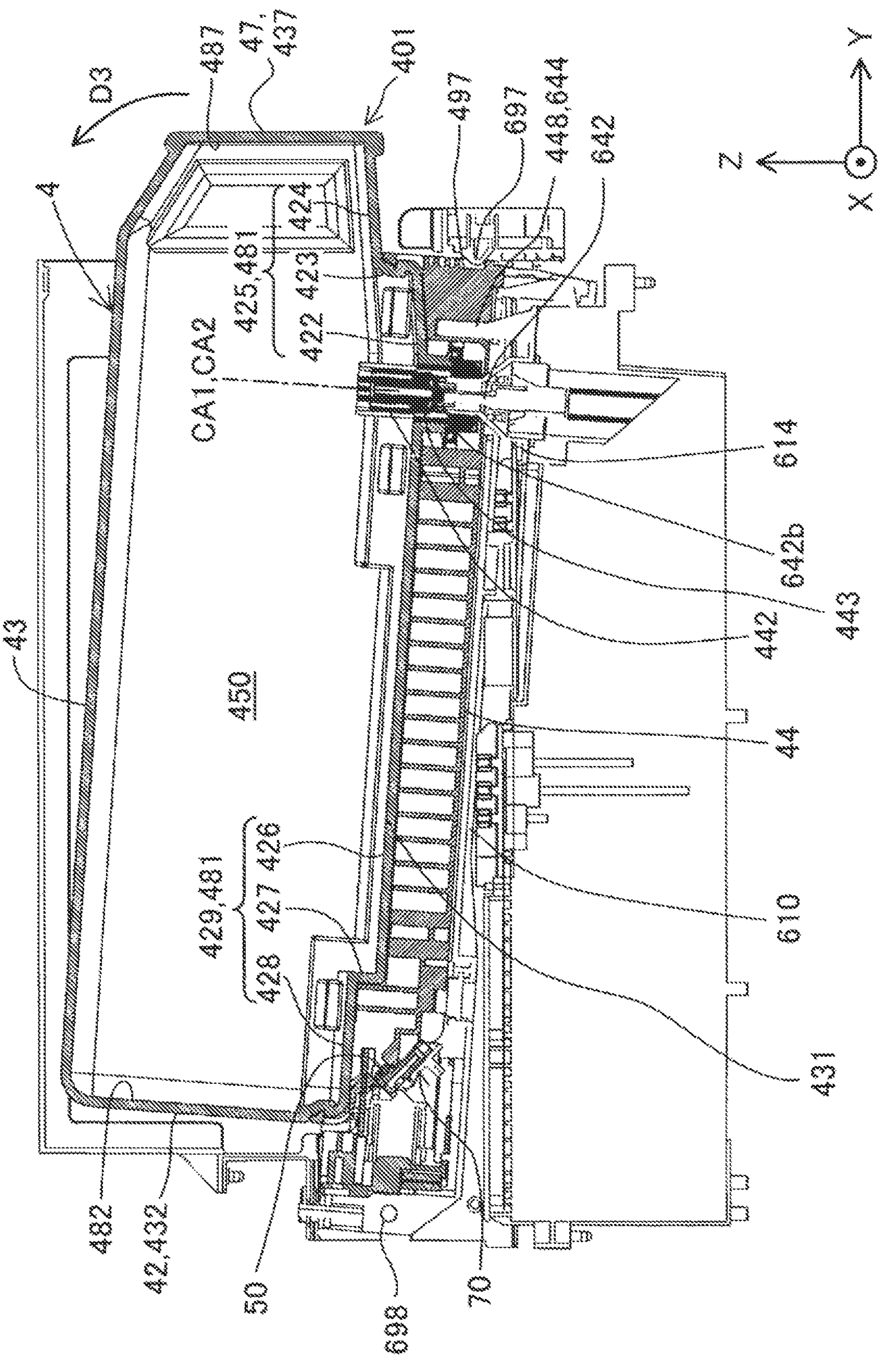
FIG. 28 is a sectional view of FIG. 27.

FIG. 24 is a first view for explaining a mounting process. FIG. 25 is a second view for explaining the mounting process. FIG. 26 is a sectional view of FIG. 25, and corresponds to a section taken along the line 3-3 of FIG. 2. FIG. 27 is a third view for explaining the mounting process. FIG. 28 is a sectional view of FIG. 27, and corresponds to a section taken along the line 3-3 of FIG. 2. FIG. 24 to 26 illustrate the terminal connection process, and FIGS. 27 and 28 illustrate the supply portion coupling process.

As illustrated in FIG. 24, when the cartridge 4 is mounted into the cartridge mounting portion 6, the cartridge 4 is first inserted from the insertion/removal opening 674 of the cartridge mounting portion 6 into the accommodation space 61. The insertion direction D1 of the cartridge 4 into the cartridge mounting portion 6 is the −Y direction, and is parallel to a direction in which the cartridge guide portions 447 extend.

When the cartridge 4 is further pushed in the insertion direction D1 from a state illustrated in FIG. 24, the terminal connection process is completed as illustrated in FIG. 25. In the completed state of the terminal connection process illustrated in FIG. 25, an end portion 402*e* of the adapter 402 on the +Y direction side is located on the insertion-direction D1 side with respect to the engagement forming body 677. In addition, as illustrated in FIG. 26, in the completed state of the terminal connection process, the cartridge-side terminals 521 and the apparatus-side terminals 721 are in contact with each other. Moreover, in the completed state of the terminal connection process, the urging member 780 is compressed, and the apparatus-side terminal portion 70 receives an external force Fa from the urging member 780. The user executes the supply portion coupling process by rotationally moving the cartridge 4 in the coupling direction D2, which is the direction of rotation around the rotation fulcrum 698, while pushing the cartridge 4 toward the insertion-direction D1 side.

When the cartridge 4 rotationally moves in the coupling direction D2, the reception of the apparatus-side supply portion positioning portion 644 by the supply portion positioning portion 448 is started before the coupling between the liquid inlet portion 642 and the liquid supply portion 442 is started. Thereafter, the positioning of the liquid supply portion 442 with respect to the liquid inlet portion 642 is started. That is, the movement of the liquid supply portion 442 in a direction intersecting the central axis CA2 of the liquid supply portion 442 is restricted. In the supply portion coupling process, when the apparatus-side supply portion positioning portion 644 is inserted into the liquid inlet portion 642, it could happen that the cartridge 4 moves minutely in the Y direction. In this case, due to expansion/contraction of the urging member 780, the apparatus-side terminal portion 70 moves in accordance with the movement of the cartridge-side terminals 521. This makes it possible to keep good contact between the cartridge-side terminals 521 and the apparatus-side terminals 721.

As illustrated in FIG. 28, in the mounted state of the cartridge 4 after the completion of the supply portion coupling process, the cartridge-side terminals 521 of the circuit board 50 and the apparatus-side terminals 721 of the apparatus-side terminal portion 70 are in contact with each other, and the liquid supply portion 442 and the liquid inlet portion 642 are coupled to each other. In the mounted state, the insertion direction D1 of the cartridge 4 intersects the direction in which the liquid supply portion 442 extends. In addition, in the mounted state, the cartridge 4 is mounted in the cartridge mounting portion 6 such that the direction in which the liquid supply portion 442 extends includes a gravity direction component. This enables the liquid in the liquid supply portion 442 to flow smoothly. Therefore, it is possible to reduce an amount of liquid that will be left in the liquid containing portion 450 without being consumed. In the present embodiment, in the mounted state, the liquid supply portion 442 is inclined with respect to the gravity direction such that an angle of 5° is formed by the central axis CA2, in the direction of which the liquid supply portion 442 extends, and the gravity direction. This angle is not limited to the above example as long as it is less than the angle of inclination θ2, which is an angle formed by the first bottom wall inner surface 422 and the first end portion inner surface 424 and the insertion direction D1. This angle may be less than 5°.

As illustrated in FIG. 28, in the mounted state of the cartridge 4, the mounting engaging portion 697 is engaged with the cartridge engaging portion 497 to keep the cartridge 4 mounted. In addition, in the mounted state of the cartridge 4, the rear-wall-side inner surface 425 and the front-wall-side inner surface 429 are sloped down toward the liquid flowing-in port 443. This enables the liquid of the liquid containing portion 450 to flow into the liquid flowing-in port 443 smoothly and, therefore, it is possible to reduce an amount of liquid that will be left in the liquid containing portion 450 without being consumed.

To take the cartridge 4 out of the cartridge mounting portion 6, the user raises the rear-wall 47 side of the cartridge 4 to rotate it in an uncoupling direction D3, which is the opposite of the coupling direction D2, around the rotation fulcrum 698. Due to this rotation, the mounting engaging portion 697 is displaced by being pushed by the main body of the cartridge 4, and, as a result, the mounting engaging portion 697 becomes disengaged from the cartridge engaging portion 497. After disengaging the mounting engaging portion 697 from the cartridge engaging portion 497, the user moves the cartridge 4 in the removal direction, thereby taking the cartridge 4 out of the cartridge mounting portion 6.

Figure 29:
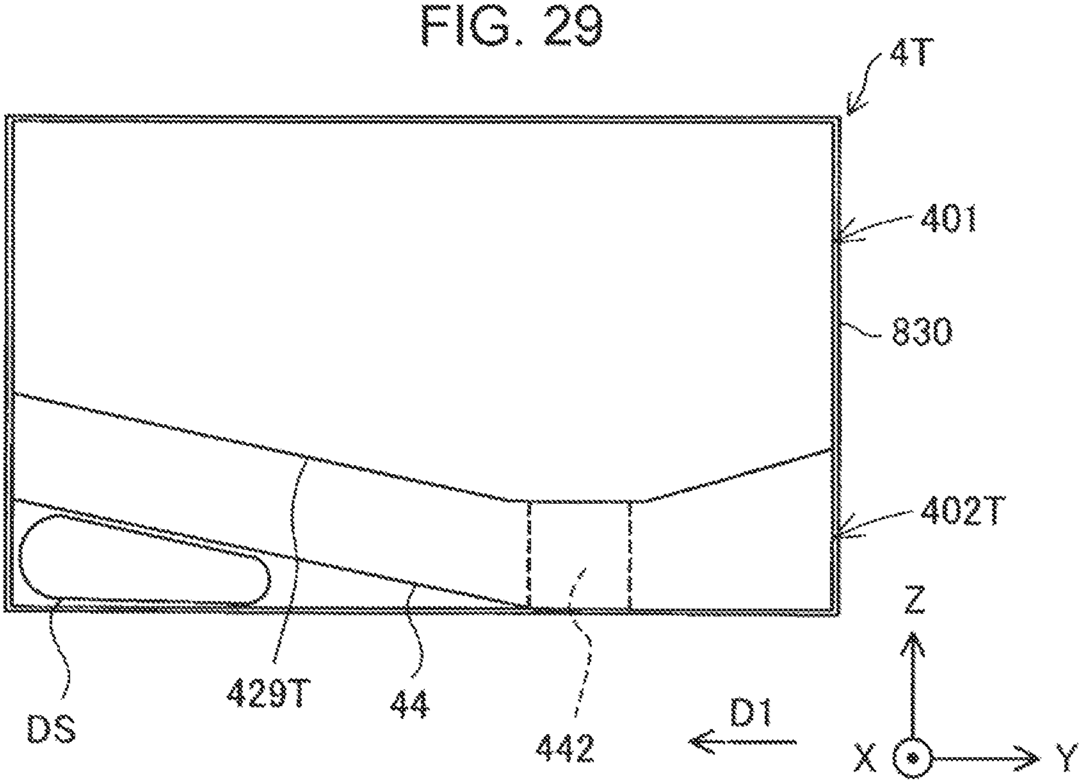
FIG. 29 is a schematic view of an individual packaging box that contains a cartridge according to a first referential example.

FIG. 29 is a schematic view of an individual packaging box 830 that contains a cartridge 4T according to a first referential example. The difference between the cartridge 4T and the cartridge 4 lies in that a front-wall-side inner surface 429T is inclined with respect to the insertion direction D1. Since the front-wall-side inner surface 429T is inclined with respect to the insertion direction D1, the outer surface of the bottom wall 44 also has a portion inclined with respect to the insertion direction D1. Therefore, when the cartridge 4T is put into the individual packaging box 830 having a shape of a rectangular parallelepiped such as a cardboard box, a gap, that is, a dead space DS, will be formed between the cartridge 4 and the individual packaging box 830. This reduces the capacity efficiency of the individual packaging box 830.

Figure 30:
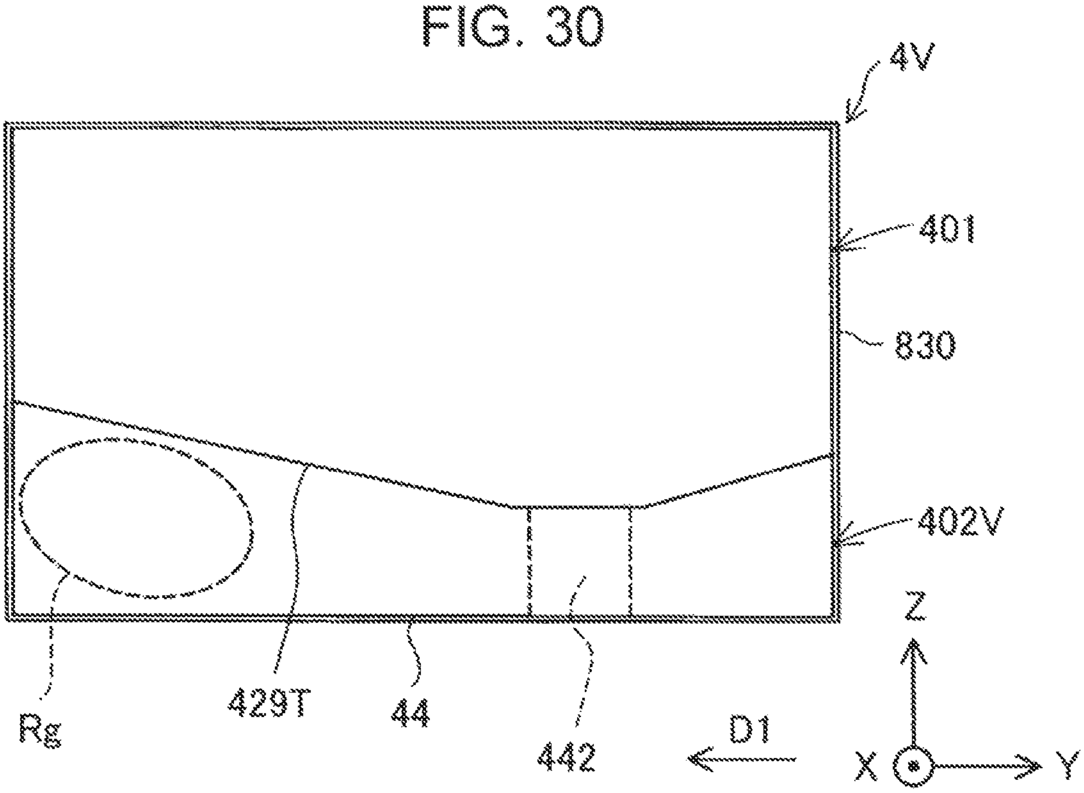
FIG. 30 is a schematic view of an individual packaging box that contains a cartridge according to a second referential example.

FIG. 30 is a schematic view of an individual packaging box 830 that contains a cartridge 4V according to a second referential example. The difference between the cartridge 4V and the cartridge 4 lies in that the front-wall-side inner surface 429T of the cartridge 4V is inclined similarly to the cartridge 4T, and its adapter 402V has a different shape. In the cartridge 4V, when the outer surface of the bottom wall 44 is configured to have a shape that is along the insertion direction D1 for the purpose of increasing the capacity efficiency of the individual packaging box 830, there is a need to increase the thickness of the adapter 402V excessively. For example, the thickness will be excessively large at a region Rg illustrated in the figure.

Figure 31:
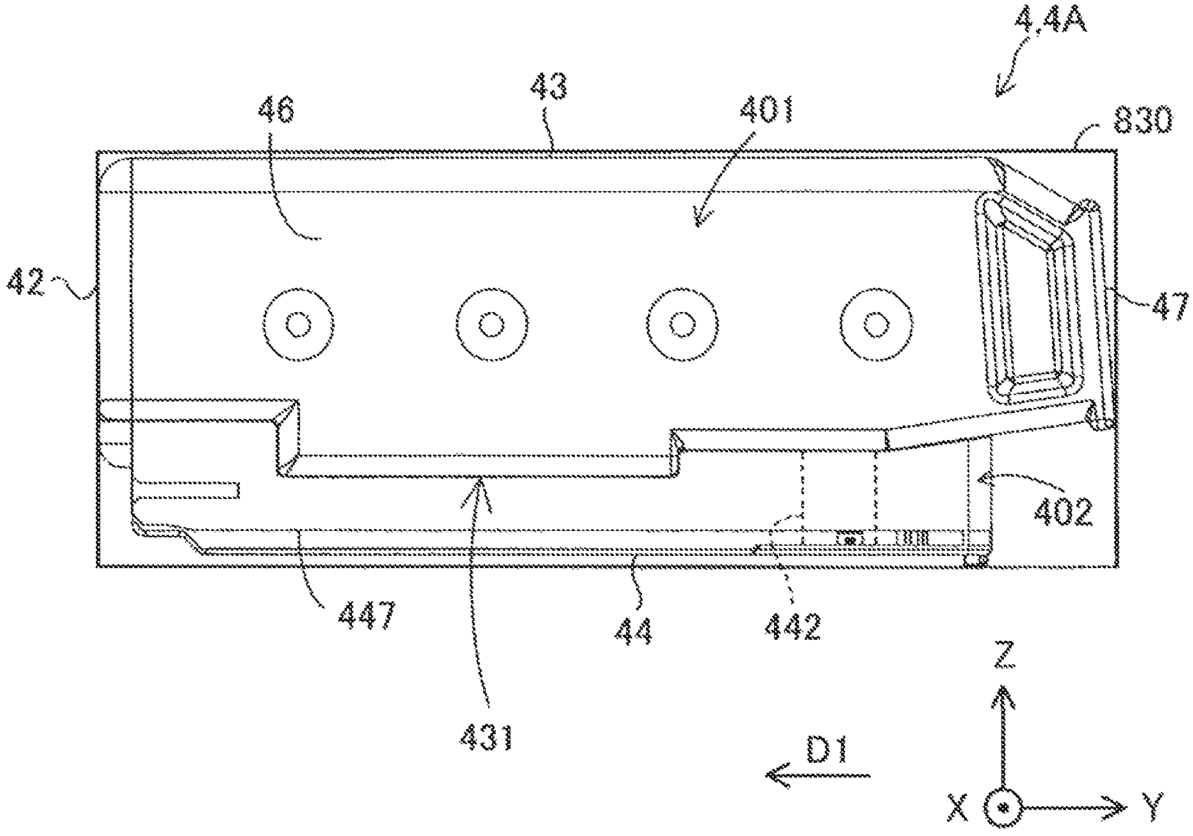
FIG. 31 is a schematic view of an individual packaging box that contains a cartridge.

FIG. 31 is a schematic view of an individual packaging box 830 that contains the cartridge 4. As illustrated in FIG. 31, the second end portion inner surface 428 and the second bottom wall inner surface 426 extend along the insertion direction D1, and this enables the outer surface of the containing portion bottom wall 431 corresponding to the rear-wall-side inner surface 425 and the second bottom wall inner surface 426 to have a shape along the insertion direction D1 without any need to increase the thickness of the containing portion bottom wall 431 excessively. Therefore, the adapter 402, which is disposed on the containing-portion-bottom-wall 431 side, also can be configured such that its bottom wall 44 has a shape along the insertion direction D1 without any need to increase its thickness excessively. That is, it is possible to widen a region having a shape along the insertion direction D1 of the adapter 402 constituting the bottom wall 44 of the cartridge 4 without any need to increase its thickness excessively. Since this reduces a gap between the cartridge 4 and the individual packaging box 830 when the cartridge 4 is put into the individual packaging box 830, it is possible to increase the capacity efficiency of the individual packaging box 830.

According to the above embodiment, in the cartridge 4, of the bottom wall inner surface 481 of the containing portion bottom wall 431, the second bottom wall inner surface 426, which is located between the liquid flowing-in port 443 and the containing portion front wall 432, extends in a direction orthogonal to the central axis CA2, that is, along the insertion direction D1. As illustrated in FIGS. 26 and 28, the containing-portion-rear-wall 437 side moves rotationally downward around the rotation fulcrum 698 when the liquid supply portion 442 is coupled to the liquid inlet portion 642. Since the containing-portion-rear-wall 437 side of the cartridge 4 moves rotationally downward, the second bottom wall inner surface 426 becomes sloped down toward the liquid flowing-in port 443. Since the first distance Dt1 is shorter than the second distance Dt2 as illustrated in FIG. 26, it is possible to make the area size of the second bottom wall inner surface 426 large. Even though the cartridge 4 includes the second bottom wall inner surface 426 having a shape along the insertion direction D1, when the cartridge 4 is in the mounted state, it is possible to cause the second bottom wall inner surface 426 to be sloped down toward the liquid flowing-in port 443 and, therefore, the liquid of the liquid containing portion 450 is able to flow to the liquid supply portion 442 smoothly. Moreover, since the second bottom wall inner surface 426 can be designed to have a shape along the insertion direction D1, it is possible to prevent the capacity of the liquid containing portion 450 from being smaller than in a case where the second bottom wall inner surface 426 has a sloped shape with respect to the insertion direction D1. Therefore, it is possible to prevent a decrease in an amount of liquid contained therein. Furthermore, since the second bottom wall inner surface 426 can be designed to have a shape along the insertion direction D1, it is possible to widen a region where a shape along the insertion direction D1 can be formed in the bottom wall 44 of the cartridge 4. Since this reduces a gap between the cartridge 4 and the individual packaging box 830 when the cartridge 4 is put into the individual packaging box 830, it is possible to increase the capacity efficiency of the individual packaging box 830.

Moreover, according to the embodiment described above, the angle of inclination θ2, which is an angle formed by the first bottom wall inner surface 422 and the first end portion inner surface 424 and the insertion direction D1, is greater than the rotation angle θ1, by which the cartridge 4 is rotated when the liquid supply portion 442 is coupled to the liquid inlet portion 642. Therefore, in the mounted state of the cartridge 4, each of the first end portion inner surface 424 and the first bottom wall inner surface 422 is sloped down toward the liquid flowing-in port 443 with respect to the insertion direction D1. In the present embodiment, on the rear-wall-side inner surface 425, the flow path along which the liquid flows toward the liquid flowing-in port 443 is sloped down toward the liquid flowing-in port 443 with respect to the insertion direction D1. Because of this slope, the liquid on the first bottom wall inner surface 422 flows toward the liquid flowing-in port 443 smoothly due to gravity. Therefore, it is possible to reduce an amount of liquid that will be left in the liquid containing portion 450 without being consumed.

Furthermore, in the first embodiment described above, the printing system 1 supplies the liquid from the cartridge 4 to the ejection head 22 by utilizing the water head difference. Therefore, the printing system 1 does not have to be equipped with a pump for supplying the liquid from the cartridge 4 to the ejection head 22. For this reason, it is possible to simplify the configuration of the printing system 1 and reduce its size.

According to the above embodiment, as illustrated in FIGS. 24 to 28, after the cartridge 4 is inserted into the accommodation space 61 through the insertion/removal opening 674, it is possible to couple the liquid inlet portion 642 and the liquid supply portion 442 to each other by putting the tip portion 642*b* of the liquid inlet portion 642 into the accommodation space 61 by displacement of the opening 614 toward the gravity-direction side around the rotation fulcrum 698. Therefore, in the terminal connection process of inserting the cartridge 4 into the accommodation space 61, it is possible to prevent the cartridge 4 from colliding with the liquid inlet portion 642 formed in a direction intersecting the insertion direction D1. Therefore, it is possible to improve operability of mounting the cartridge 4 into the cartridge mounting portion 6.

According to the above embodiment, as illustrated in FIG. 28, the cartridge 4 has the liquid supply portion 442 disposed in the bottom wall 44 intersecting the front wall 42 located on the insertion-direction D1 side. Because of this configuration, in the mounted state, the bottom wall 442 in which the liquid supply portion 442 is disposed is located on the gravity-direction side and, therefore, the liquid contained in the liquid containing portion 450 is able to flow smoothly therefrom to the liquid supply portion 442. Therefore, it is possible to reduce an amount of liquid that will be left in the liquid containing portion 450 without being consumed. As illustrated in FIG. 24, the insertion direction D1 of the cartridge 4 and the removal direction, which is the opposite of the insertion direction D1, are the Y direction and go along the horizontal direction. Therefore, just moving the cartridge 4 horizontally suffices when the cartridge 4 is inserted into and removed from the cartridge mounting portion 6, resulting in improved operability of the cartridge 4. In particular, as in the present embodiment, the cartridge 4 having a large outer shape for accommodating a large amount of liquid can be inserted into and removed from the cartridge mounting portion 6 along the horizontal direction, and the operability of the cartridge 4 can thus be further improved. As described above, in the mounted state of the cartridge 4, the insertion direction D1 of the cartridge 4 and the extending direction of the liquid supply portion 442 intersect each other; accordingly, the insertion direction D1 can be set to the horizontal direction, and the extending direction can be set to a direction including a vertical direction component. Therefore, it is possible to reduce an amount of liquid that will be left in the liquid containing portion 450 without being consumed while improving the operability of the cartridge 4.

According to the above embodiment, as illustrated in FIGS. 11 and 19, the cartridge 4 includes the cartridge guide portions 447 and thus can be moved smoothly in the insertion direction D1. In particular, in the present embodiment, the outer shape of the cartridge 4 is the largest in the insertion direction D1. Since the cartridge 4 has the cartridge guide portions 447 to be guided in the insertion direction, it is possible to move the cartridge 4 more smoothly in the insertion direction D1. As illustrated in FIG. 19, the cartridge guide portions 447 include the first cartridge guide portion 447*a* formed on the first sidewall 45 and the second cartridge guide portion 447*b* formed on the second sidewall 46 corresponding to the first sidewall 45. Since this configuration makes it possible to provide the cartridge guide portions 447 on the respective sides of the cartridge 4 in the width direction, an insertion posture of the cartridge 4 will be stable when the cartridge 4 is moved in the direction of insertion into the cartridge mounting portion 6.

According to the above embodiment, as illustrated in FIG. 11, the circuit board 50 having the cartridge-side terminals 521 is disposed at the corner portion 89 where the front wall 42 and the bottom wall 44 intersect each other. This configuration enables easy contact between the cartridge-side terminals 521 and the apparatus-side terminals 721 by moving the cartridge 4 into the accommodation space 61 of the cartridge mounting portion 6 in the insertion direction. In particular, in the present embodiment, as illustrated in FIG. 14, the cartridge 4 has the terminal positioning portion 906 at the corner portion 89 and, therefore, the cartridge-side terminals 521 and the apparatus-side terminals 721 can be reliably brought into contact with each other in the mounting process.

According to the above embodiment, as illustrated in FIG. 12, the cartridge 4 has the liquid container 401 and the adapter 402, and a degree of freedom in design can thus be improved. For example, a common adapter 402 can be used for a plurality of liquid containers 401 and 401B whose liquid containing portions 450 have different capacities. Moreover, since the cartridge 4 has the liquid container 401 and the adapter 402, the liquid container 401 can be removed from the adapter 402 and a new liquid container 401 can be attached to the adapter 402, after the liquid has been consumed. This improves recyclability of the cartridge 4.

In addition, in the present embodiment, the adapter 402 that can be used in common for different types of liquid containers 401 and 401B is provided with the terminal positioning portions 906, the supply portion positioning portion 448, the cartridge-side identification member 430, and the cartridge engaging portion 497, which are elements configured to cooperate with the cartridge mounting portion 6. Therefore, even though the types of liquid containers 401 are different from each other, the same type of adapter 402 can be used, and a manufacturing cost of the cartridge 4 can thus be reduced. This makes it possible to simplify the structure of the liquid containers 401 and 401B.

According to the above embodiment, as illustrated in FIG. 11, with regard to the −Y direction, which is the insertion direction D1, the supply portion positioning portion 448 is located on the opposite side away from the cartridge-side terminals 521 of the circuit board 50, with the liquid supply portion 442 interposed therebetween. Moreover, as illustrated in FIG. 26, the rotation fulcrum 698 is disposed on the side where the cartridge-side terminals 521 are located. This makes it possible to make the distance between the rotation fulcrum 698 and the supply portion positioning portion 448 longer when the liquid inlet portion 642 and the liquid supply portion 442 are coupled to each other by rotationally moving the cartridge 4 around the rotation fulcrum 698. Making the distance between the rotation fulcrum 698 and the supply portion positioning portion 448 longer makes it possible to make the curve of the locus of movement of the supply portion positioning portion 448, namely, its curvature, smaller when the cartridge 4 is moved rotationally. That is, it is possible to make the locus of movement of the supply portion positioning portion 448 closer to a straight line. This makes it easier for the supply portion positioning portion 448 to receive the apparatus-side terminal positioning portion 642. Moreover, even if the protrusion length of the apparatus-side supply portion positioning portion 642 is increased, smooth reception by the supply portion positioning portion 448 is achieved. Therefore, it is possible to increase the protrusion length of the apparatus-side supply portion positioning portion 642, and, accordingly, the apparatus-side supply portion positioning portion 642 is received by the supply portion positioning portion 448 at an earlier phase in the supply portion coupling process. This makes it possible to perform the positioning of the liquid supply portion 442 with respect to the liquid inlet portion 642 with higher precision.

B. Other Embodiments

B-1. Other Embodiment 1

In the above embodiment, as illustrated in FIG. 24, the insertion direction D1 is parallel to the horizontal direction, but is not limited thereto. In another embodiment, the insertion direction D1 may be inclined with respect to the horizontal direction as long as it has a horizontal direction component. For example, the insertion direction D1 may be inclined with respect to the horizontal direction within a range of greater than 0° to not greater than 15°.

B-2. Other Embodiment 2

In the above embodiment, as illustrated in FIG. 12, the liquid container 401 and the adapter 402 are separate bodies, but may be integrated with each other.

B-3. Other Embodiment 3

The present disclosure is not limited to an ink-jet printer and an ink cartridge thereof, but can also be applied to any printing apparatus that ejects a liquid other than ink, and a cartridge thereof. For example, the present disclosure can be applied to the following various printing apparatuses and cartridges thereof.

(1) Image recording apparatus such as a facsimile apparatus or the like;

(2) Printing apparatus configured to eject a colorant used in color filter production for an image display device such as a liquid crystal display or the like;

(3) Printing apparatus configured to eject an electrode material used for forming electrodes of an organic EL (Electro Luminescence) display, a surface-emitting display (Field Emission Display, FED), or the like;

(4) Printing apparatus configured to eject a liquid containing a living organic material used in biochip fabrication;

(5) Sample printing apparatus as a precision pipette;

(6) Lubricating oil printing apparatus;

(7) Liquid resin printing apparatus;

(8) Printing apparatus configured to eject, with pinpoint accuracy, lubricating oil onto a precision device such as a watch, a camera, or the like;

(9) Printing apparatus configured to eject transparent liquid resin such as ultraviolet ray curing resin onto a substrate so as to form a micro hemispherical lens (optical lens) used in an optical communication element or the like;

(10) Printing apparatus configured to eject an acid etchant or an alkaline etchant for etching a substrate or the like;

(11) Printing apparatus equipped with a liquid ejecting head for ejecting any other micro droplets.

The term “liquid droplet” refers to a state of liquid ejected from a printing apparatus and encompasses a particulate droplet, a tear-shaped droplet, and a droplet that forms a thready tail. In addition, the “liquid” mentioned here may be any material that can be ejected by the printing apparatus. For example, the “liquid” may be a material in a state where a substance is in a liquid phase, and materials in a liquid state having high or low viscosity and materials in a liquid state such as sol, gel water, other inorganic solvents, organic solvents, solutions, liquid resins, and liquid metals are also included in the “liquid”. In addition, not only a liquid as one state of a substance but also a liquid in which particles of a functional material formed of a solid substance such as pigments or metal particles are dissolved, dispersed, or mixed in a solvent are included in the “liquid”. Typical examples of the liquid are: ink described in the above embodiment, liquid crystal, and the like. Here, the ink includes general water-based inks, oil-based inks, and various liquid compositions such as gel inks and hot melt inks.

C. Other Aspects

The present disclosure is not limited to the above-described embodiment, and can be realized by various configurations without deviating from the spirit thereof. For example, technical features of an embodiment corresponding to technical features in each of aspects described below can be appropriately replaced or combined in order to solve some or all of the problems described above or achieve some or all of the effects described above. In addition, the technical feature may be deleted unless it is described as essential in the present specification.

(1) According to a first aspect of the present disclosure, a cartridge configured to be detachably mounted into a cartridge mounting portion of a printing apparatus having a liquid inlet portion configured to receive a liquid is provided. The cartridge includes a liquid containing portion containing the liquid and having a containing portion front wall located on an insertion direction side, an insertion direction being a direction in which the cartridge is inserted into the cartridge mounting portion, a containing portion rear wall facing the containing portion front wall, and a containing portion bottom wall intersecting the containing portion front wall and the containing portion rear wall; a liquid flowing-in port formed in the containing portion bottom wall; and a liquid supply portion via which the liquid of the liquid containing portion is supplied to the liquid inlet portion, wherein the liquid supply portion is coupled to the liquid inlet portion due to rotational movement of a rear-wall side, which is closer to the containing portion rear wall, of the cartridge downward around a rotation fulcrum, which is located on the insertion direction side, of the cartridge mounting portion, and in the insertion direction, a first distance between the liquid flowing-in port and a rear wall inner surface, which is an inner surface of the containing portion rear wall, is shorter than a second distance between the liquid flowing-in port and a front wall inner surface, which is the inner surface of the containing portion front wall. When the liquid supply portion is coupled to the liquid inlet portion, the rear-wall side, which is closer to the containing portion rear wall, moves rotationally downward around the rotation fulcrum. Therefore, even if the second bottom wall inner surface, which is a portion located between the liquid flowing-in port and the containing portion front wall as a part of the inner surface of the containing portion rear wall, extends in the insertion direction, which is the horizontal direction, in the mounted state in which the cartridge is mounted in the cartridge mounting portion, the second bottom wall inner surface is sloped down toward the liquid flowing-in port in the mounted state of the cartridge. With the above configuration, it is possible to make the area size of the second bottom wall inner surface described above larger because the first distance is shorter than the second distance. Therefore, even if the second bottom wall inner surface is designed to have a shape along the insertion direction, when the cartridge is in the mounted state, it is possible to cause the second bottom wall inner surface to be sloped toward the liquid flowing-in port and, therefore, the liquid of the liquid containing portion is able to flow to the liquid supply portion smoothly. Moreover, since the second bottom wall inner surface can be designed to have a shape along the insertion direction, it is possible to prevent a decrease in the capacity of the liquid containing portion. Therefore, it is possible to prevent a decrease in an amount of liquid contained therein. Furthermore, since the second bottom wall inner surface can be designed to have a shape along the insertion direction, it is possible to widen a region where a shape along the insertion direction can be formed in the bottom wall of the cartridge. Since this reduces a gap between the cartridge and an individual packaging box when the cartridge is put into the individual packaging box, it is possible to increase the capacity efficiency of the individual packaging box.

(2) In the above aspect, a bottom wall inner surface, which is the inner surface of the containing portion bottom wall, may include a first bottom wall inner surface located between the liquid flowing-in port and the containing portion rear wall in the insertion direction, connected to the liquid flowing-in port, and inclined with respect to the insertion direction such that a slope goes outward in relation to the liquid containing portion toward the liquid flowing-in port, and an angle of inclination of the first bottom wall inner surface may be greater than a rotation angle by which the cartridge is rotated when the liquid supply portion is coupled to the liquid inlet portion. According to this aspect, when the cartridge is put into the mounted state by being rotated, it is possible to cause the second bottom wall inner surface to be sloped down toward the liquid flowing-in port. Therefore, it is possible to reduce an amount of liquid that will be left in the liquid containing portion.

(3) In the above aspect, a bottom wall inner surface, which is the inner surface of the containing portion bottom wall, may include a second bottom wall inner surface located between the liquid flowing-in port and the containing portion front wall in the insertion direction, connected to the liquid flowing-in port, and extending in the insertion direction, and in a mounted state of the cartridge, in which the liquid supply portion is coupled to the liquid inlet portion, the second bottom wall inner surface may be sloped down toward the liquid flowing-in port with respect to the insertion direction. According to this aspect, since the second bottom wall inner surface can be designed to have a shape along the insertion direction, it is possible to prevent a decrease in the capacity of the liquid containing portion. Therefore, it is possible to prevent a decrease in an amount of liquid contained therein. Moreover, since the second bottom wall inner surface can be designed to have a shape along the insertion direction, it is possible to reduce a gap between the cartridge and an individual packaging box when the cartridge is put into the individual packaging box and, therefore, it is possible to increase the capacity efficiency of the individual packaging box.

(4) According to a second aspect of the present disclosure, a printing system is provided. The printing system includes a printing apparatus including a cartridge mounting portion into which a cartridge is mounted; and the cartridge according to the above aspect. According to this aspect, even if the second bottom wall inner surface is designed to have a shape along the insertion direction, when the cartridge is in the mounted state, it is possible to cause the second bottom wall inner surface to be sloped toward the liquid flowing-in port and, therefore, the liquid of the liquid containing portion is able to flow to the liquid supply portion smoothly. Moreover, since the second bottom wall inner surface can be designed to have a shape along the insertion direction, it is possible to prevent a decrease in the capacity of the liquid containing portion. Therefore, it is possible to prevent a decrease in an amount of liquid contained therein. Furthermore, since the second bottom wall inner surface can be designed to have a shape along the insertion direction, it is possible to widen a region where a shape along the insertion direction can be formed in the bottom wall of the cartridge. Since this reduces a gap between the cartridge and an individual packaging box when the cartridge is put into the individual packaging box, it is possible to increase the capacity efficiency of the individual packaging box.

(5) In the above aspect, the printing apparatus may further include an ejection head to which the liquid is supplied from the cartridge by utilizing a water head difference, the ejection head being configured to perform liquid ejection; and a flow conduit for communication between the ejection head and the cartridge. According to this aspect, the printing system does not have to be equipped with a pump for supplying the liquid from the cartridge to the ejection head. For this reason, it is possible to simplify the configuration of the printing system.

(6) In the above aspect, the cartridge mounting portion may include an accommodation space into which the cartridge is inserted in an insertion direction and which accommodates the cartridge, a liquid inlet portion that extends in a direction intersecting the insertion direction and is coupled to a liquid supply portion of the cartridge, a first apparatus wall that includes an insertion removal opening that is an entrance into, and an exit out of, the accommodation space, a second apparatus wall that faces the first apparatus wall, and a support member that forms an apparatus bottom wall including an opening and supports the cartridge, the apparatus bottom wall intersecting the first apparatus wall and the second apparatus wall, the liquid inlet portion may be located on an opposite side away from the support member, with the accommodation space interposed therebetween, and the cartridge mounting portion may further include a rotation fulcrum located on a second apparatus wall side and configured to put a tip portion of the liquid inlet portion into the accommodation space through the opening by letting the support member move rotationally to cause displacement of the opening toward a gravity-direction side. According to this aspect, after the cartridge is inserted into the accommodation space through the insertion/removal opening, it is possible to couple the liquid inlet portion and the liquid supply portion to each other by putting the tip portion of the liquid inlet portion into the accommodation space by displacement of the opening toward the gravity-direction side. Therefore, it is possible to improve operability of mounting the cartridge into the cartridge mounting portion.

Besides the above aspects, the present disclosure can be realized in an aspect of a method of manufacturing a cartridge, an aspect of a mechanism configured to mount a cartridge into a cartridge mounting portion, and the like.

REFERENCE SIGNS LIST

1 printing system
2 printing sheet
4, 4C, 4M, 4K, 4T, 4V cartridge
4A first type of cartridge
4B second type of cartridge
6 cartridge mounting portion
8 cap member
10 printing apparatus
13 replacement cover
15 operation button
20 carriage
22 ejection head
24 tube
30 drive mechanism
31 control unit
32 timing belt
34 drive motor
41 main body
42 front wall
43 top wall
44 bottom wall
45 first sidewall
46 second sidewall
47 rear wall
50 circuit board
50*fa* front surface
61 accommodation space
61C, 61M, 61Y, and 61K slot
62 second apparatus wall
63 apparatus top wall
64 apparatus bottom wall
65 first apparatus sidewall
66 second apparatus sidewall
67 first apparatus wall
70 apparatus-side terminal portion
73 holding mechanism
89 corner portion
90 recess portion
401, 401B liquid container
402, 402*v* adapter
402*e* end portion
422 first bottom wall inner surface
423 first level difference surface
424 first end portion inner surface
425 rear-wall-side inner surface
426 second bottom wall inner surface

427 second level difference surface
428 second end portion inner surface
429, 429T front-wall-side inner surface
430 cartridge-side identification member
431 containing portion bottom wall
432 containing portion front wall
433 containing portion top wall
435 first containing portion sidewall
436 second containing portion sidewall
437 containing portion rear wall
442 liquid supply portion
443 liquid flowing-in port
446 insertion opening
447 cartridge guide portion
447*a* first cartridge guide portion
447*b* second cartridge guide portion
448 supply portion positioning portion
449 internal flow passage
450 liquid containing portion
461 supply portion disposing chamber
481 bottom wall inner surface
482 front wall inner surface
487 rear wall inner surface
497 cartridge engaging portion
521 cartridge-side terminal
525 storage device
602 apparatus guide portion
602*a* first apparatus guide portion
602*b* second apparatus guide portion
610 support member
611 first support sidewall
612 second support sidewall
613 main wall
614 opening
625 apparatus urging member
630 apparatus-side identification member
642 liquid inlet portion
642*a* base end portion
642*b* tip portion
644 supply portion positioning portion
644*a* one end portion
644*b* other end portion
674 insertion/removal opening
677 engagement forming body
697 mounting engaging portion
698 rotation fulcrum
699 liquid reservoir portion
721 apparatus-side terminal
722 terminal contact
739 connector
750 terminal holding portion
750*fa* holding portion surface
750*ft* first holding portion sidewall
750*fw* second holding portion sidewall
756 portion
756*t* portion
756*w* portion
780 urging member
782 attaching member
830 individual packaging box
902 recess portion sidewall
902*t* first recess portion sidewall
902*w* second recess portion sidewall
906 terminal positioning portion
906*t* first terminal positioning portion
906*w* second terminal positioning portion
916 end wall
982 recess portion front wall
988 recess portion bottom wall
442*e*1 supply tip portion
442*e*2 supply base end portion
CA1 central axis
CA2 central axis
D1 insertion direction
D2 coupling direction
D3 uncoupling direction
DS dead space
Dt1 first distance
Dt2 second distance
Fa external force
Ft1 external force
LF liquid surface
MP middle portion
OD1 opposed direction
Rp terminal rotation fulcrum

The invention claimed is:

1. A cartridge configured to be detachably mounted into a cartridge mounting portion of a printing apparatus having a liquid inlet portion configured to receive a liquid, the cartridge comprising:

a liquid containing portion containing the liquid and having (i) a containing portion front wall located on an insertion direction side, an insertion direction being a direction in which the cartridge is inserted into the cartridge mounting portion, (ii) a containing portion rear wall facing the containing portion front wall, and (iii) a containing portion bottom wall intersecting the containing portion front wall and the containing portion rear wall;

a liquid flowing-in port formed in the containing portion bottom wall; and a liquid supply portion via which the liquid of the liquid containing portion is supplied to the liquid inlet portion, wherein the liquid supply portion is coupled to the liquid inlet portion due to rotational movement of a rear-wall side, which is closer to the containing portion rear wall, of the cartridge downward around a rotation fulcrum, which is located on the insertion direction side, of the cartridge mounting portion, in the insertion direction, a first distance between a central axis of the liquid flowing-in port and a rear wall inner surface, which is an inner surface of the containing portion rear wall, is shorter than a second distance between the central axis of the liquid flowing-in port and a front wall inner surface, which is an inner surface of the containing portion front wall, and the containing portion rear wall forms a surface on a removal direction side opposite to the insertion direction.

2. The cartridge according to claim 1, wherein a bottom wall inner surface, which is an inner surface of the containing portion bottom wall, includes a first bottom wall inner surface (i) located between the liquid flowing-in port and the containing portion rear wall in the insertion direction, (ii) connected to the liquid flowing-in port, and (iii) inclined with respect to the insertion direction such that a slope goes outward in relation to the liquid containing portion toward the liquid flowing-in port, and an angle of inclination of the first bottom wall inner surface is greater than a rotation angle by which the cartridge is rotated when the liquid supply portion is coupled to the liquid inlet portion.

3. The cartridge according to claim 1, wherein a bottom wall inner surface, which is an inner surface of the containing portion bottom wall, includes a second bottom wall inner surface (i) located between the liquid flowing-in port and the containing portion front wall in the insertion direction, (ii) connected to the liquid flowing-in port, and (iii) extending in the insertion direction, and in a mounted state of the cartridge, in which the liquid supply portion is coupled to the liquid inlet portion, the second bottom wall inner surface is sloped down toward the liquid flowing-in port with respect to the insertion direction.

4. A printing system, comprising:

a printing apparatus including a cartridge mounting portion into which a cartridge is mounted; and the cartridge according to claim 1.

5. The printing system according to claim 4, wherein the printing apparatus further includes an ejection head to which the liquid is supplied from the cartridge by utilizing a water head difference, the ejection head being configured to perform liquid ejection; and a flow conduit for communication between the ejection head and the cartridge.

6. The printing system according to claim 4, wherein the cartridge mounting portion includes an accommodation space into which the cartridge is inserted in an insertion direction and which accommodates the cartridge, a liquid inlet portion that extends in a direction intersecting the insertion direction and is coupled to a liquid supply portion of the cartridge, a first apparatus wall that includes an insertion removal opening that is an entrance into, and an exit out of, the accommodation space, a second apparatus wall that faces the first apparatus wall, and a support member that forms an apparatus bottom wall including an opening and supports the cartridge, the apparatus bottom wall intersecting the first apparatus wall and the second apparatus wall, the liquid inlet portion is located on an opposite side away from the support member, with the accommodation space interposed therebetween, and the cartridge mounting portion further includes a rotation fulcrum located on a second apparatus wall side and configured to put a tip portion of the liquid inlet portion into the accommodation space through the opening by letting the support member move rotationally to cause displacement of the opening toward a gravity-direction side.

7. A printing system, comprising:

a printing apparatus including a cartridge mounting portion into which a cartridge is mounted, the cartridge mounting portion including:

an accommodation space into which the cartridge is inserted in an insertion direction and which accommodates the cartridge, the insertion direction being a direction in which the cartridge is inserted into the cartridge mounting portion;

a liquid inlet portion that extends in a direction intersecting the insertion direction and is coupled to a liquid supply portion of the cartridge;

a first apparatus wall that includes an insertion removal opening that is an entrance into, and an exit out of, the accommodation space;

a second apparatus wall that faces the first apparatus wall;

a support member that forms an apparatus bottom wall including an opening and supports the cartridge, the apparatus bottom wall intersecting the first apparatus wall and the second apparatus wall, and the liquid inlet portion being located on an opposite side away from the support member, with the accommodation space interposed therebetween; and a rotation fulcrum located on a second apparatus wall side and configured to put a tip portion of the liquid inlet portion into the accommodation space through the opening by letting the support member move rotationally to cause displacement of the opening toward a gravity-direction side; and the cartridge configured to be detachably mounted into the cartridge mounting portion of the printing apparatus having the liquid inlet portion configured to receive a liquid, the cartridge comprising:

a liquid containing portion containing the liquid and having (i) a containing portion front wall located on an insertion direction side, (ii) a containing portion rear wall facing the containing portion front wall, and (iii) a containing portion bottom wall intersecting the containing portion front wall and the containing portion rear wall;

a liquid flowing-in port formed in the containing portion bottom wall; and the liquid supply portion via which the liquid of the liquid containing portion is supplied to the liquid inlet portion, wherein the liquid supply portion is coupled to the liquid inlet portion due to rotational movement of a rear-wall side, which is closer to the containing portion rear wall, of the cartridge downward around the rotation fulcrum, which is located on the insertion direction side, of the cartridge mounting portion, and in the insertion direction, a first distance between the liquid flowing-in port and a rear wall inner surface, which is an inner surface of the containing portion rear wall, is shorter than a second distance between the liquid flowing-in port and a front wall inner surface, which is the inner surface of the containing portion front wall.

* * * * *